United States Patent
Cobb et al.

(10) Patent No.: US 8,578,017 B2
(45) Date of Patent: Nov. 5, 2013

(54) AUTOMATIC CORRELATION OF SERVICE LEVEL AGREEMENT AND OPERATING LEVEL AGREEMENT

(75) Inventors: Jeffrey R. Cobb, Belmont, CA (US); Ling Thio, Sunnyvale, CA (US); Brian Zuzga, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1638 days.

(21) Appl. No.: 11/610,409

(22) Filed: Dec. 13, 2006

(65) Prior Publication Data

US 2007/0263541 A1 Nov. 15, 2007

Related U.S. Application Data

(60) Provisional application No. 60/799,607, filed on May 11, 2006, provisional application No. 60/868,016, filed on Nov. 30, 2006.

(51) Int. Cl.
*G06F 15/173* (2006.01)
(52) U.S. Cl.
USPC ........... 709/224; 709/203; 709/217; 709/223; 709/238
(58) Field of Classification Search
USPC .................. 709/224, 203, 217, 219, 223, 238
See application file for complete search history.

(56) References Cited

U.S. PATENT DOCUMENTS

2006/0064486 A1* 3/2006 Baron et al. .................. 709/224
2006/0085543 A1* 4/2006 Hrastar et al. ................ 709/224

* cited by examiner

*Primary Examiner* — Phuoc Nguyen
(74) *Attorney, Agent, or Firm* — Vierra Magen Marcus LLP

(57) ABSTRACT

Data collected during runtime and associated with a service level agreement and operating level agreement for a network service are automatically correlated together. A network monitoring system monitors the network service during runtime to determine SLA and OLA violations. An SLA is tested against traffic monitoring data derived from monitoring traffic between a network service system and one or more users of the system. An OLA is tested against application runtime data generated from monitoring a transaction occurring between an application server and a backend or other internal entity of the network service system. The data collected during runtime can be correlated using a hierarchy based on business transactions or in some other manner. Because the traffic monitoring data and application runtime data are organized using a similar data hierarchy, the traffic monitoring data corresponding to an SLA may be correlated to the application runtime data corresponding to the same business transaction and one or more OLAs.

35 Claims, 24 Drawing Sheets

AUTOMATIC CORRELATION OF SERVICE LEVEL AGREEMENT AND OPERATING LEVEL AGREEMENT

CLAIM OF PRIORITY

This application claims the benefit of commonly assigned co-pending U.S. provisional patent application No. 60/799,607, filed May 11, 2006, titled "Traffic and Infrastructure Monitoring System", having inventors Ling Thio, Brian Zuzga, Jyoti Bansal, Jeffrey Cobb, Jon Ruiz, and Patrick O'Sullivan, and U.S. provisional patent application No. 60/868,016, filed Nov. 30, 2006, titled "Automatic Correlation of Service Level Agreement and Operating Level Agreement," having inventors Jeffrey R. Cobb, Ling Thio, and Brian Zuzga.

BACKGROUND

The growing popularity of the Internet and other computer networks has resulted in widespread development and use of application-based network services provided over a network. These services implement important functions for businesses which have a presence on the computer networks. Accordingly, businesses spend resources to develop and manage these network services.

Managing network services can include entering quality control agreements for the services they provide, such as a service level agreement (SLA) or an operating level agreement (OLA). An SLA is an agreement between a user of a network service and a provider of the service. Under an SLA, the service provider agrees to meet certain quality thresholds for the level of service provided to a particular user. For example, an SLA may indicate that a certain transaction provided by a network service provider to a user must have an average response time of one second or less over a month. An OLA specifies a performance threshold to be satisfied by a service provided between internal entities of a network service system. For example, an OLA may specify a response time threshold to be satisfied by a backend service when processing a request from a particular application server. The SLA and OLA terminology is associated with the Information Technology Infrastructure Library (ITIL), a globally recognized collection of best practices for information technology (IT) service management.

Because SLAs and OLAs are entered between different entities, address different types of data and involve different thresholds, the agreements are not linked together. As such, an administrator must manually search through and select an SLA and an OLA to attempt to address related failures. SLA and OLA failures may be close together in time, but an administrator will still not know if the failures are truly related. Further, an SLA usually addresses one or more related transactions with the network service from the point of view of the user and an OLA usually addresses a type of internal transaction from the point of view of a backend. Thus, because the data provided by an OLA can be for several applications in communication with a backend, it is difficult to determine a specific cause of a performance problem using OLA related application runtime data and SLA traffic monitoring data.

SUMMARY

The technology described herein automatically correlates data associated with a service level agreement (SLA) and operating level agreement (OLA) for a network service. A network monitoring system monitors the network service during runtime to determine SLA and OLA violations. Data associated with a failed SLA and corresponding OLAs are correlated together. The data can be correlated using a hierarchy based on business transactions or in some other manner.

An SLA is tested against data generated by a network monitoring system. An OLA is also tested against data generated from a network monitoring system. In some embodiments, both an SLA and an OLA may be tested against data collected by a traffic monitoring system and an application monitoring system. In some embodiments, when application runtime data is available, the application runtime data can be used to correlate the data tested against the SLA and the data tested against the OLA, thereby correlating the performance of transactions associated with an SLA and OLA. In some embodiments, both the traffic monitoring data and application runtime data are organized within a similar data hierarchy associated with business processes and business transactions. As such, the traffic monitoring data corresponding to a business transaction may be correlated to the application runtime data corresponding to the same business transaction and one or more SLAs and related OLAs.

One embodiment involves collecting traffic monitoring data and application runtime data over a period of time and comparing the data to a set of service level thresholds and operating level thresholds, respectively. A portion of the traffic monitoring data is automatically identified that corresponds to the application runtime data.

Another embodiment involves determining whether a service level provided by a network server has satisfied a service level threshold for a period of time. After the determination, application runtime data associated with a level of operation for one or more applications is accessed and automatically correlated to the traffic monitoring data.

An embodiment may involve an apparatus with one or more processors that configure one or more sets of service level thresholds associated with providing a network service by a network server and one or more sets of operating level thresholds associated with processing network traffic by an application. The processors may then identify a set of service level thresholds that have not been satisfied by the network server over a period of time and automatically determine one or more sets of operating level thresholds that correspond to the set of service level thresholds.

Yet another embodiment may access traffic monitoring data that is derived from monitoring network service traffic and is associated with service level thresholds not satisfied by the traffic monitoring data. Transaction information is then identified from the traffic monitoring data. Application runtime data which is generated from monitoring an application that processes network service traffic can then be accessed, wherein the application runtime data is associated with the transaction information.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
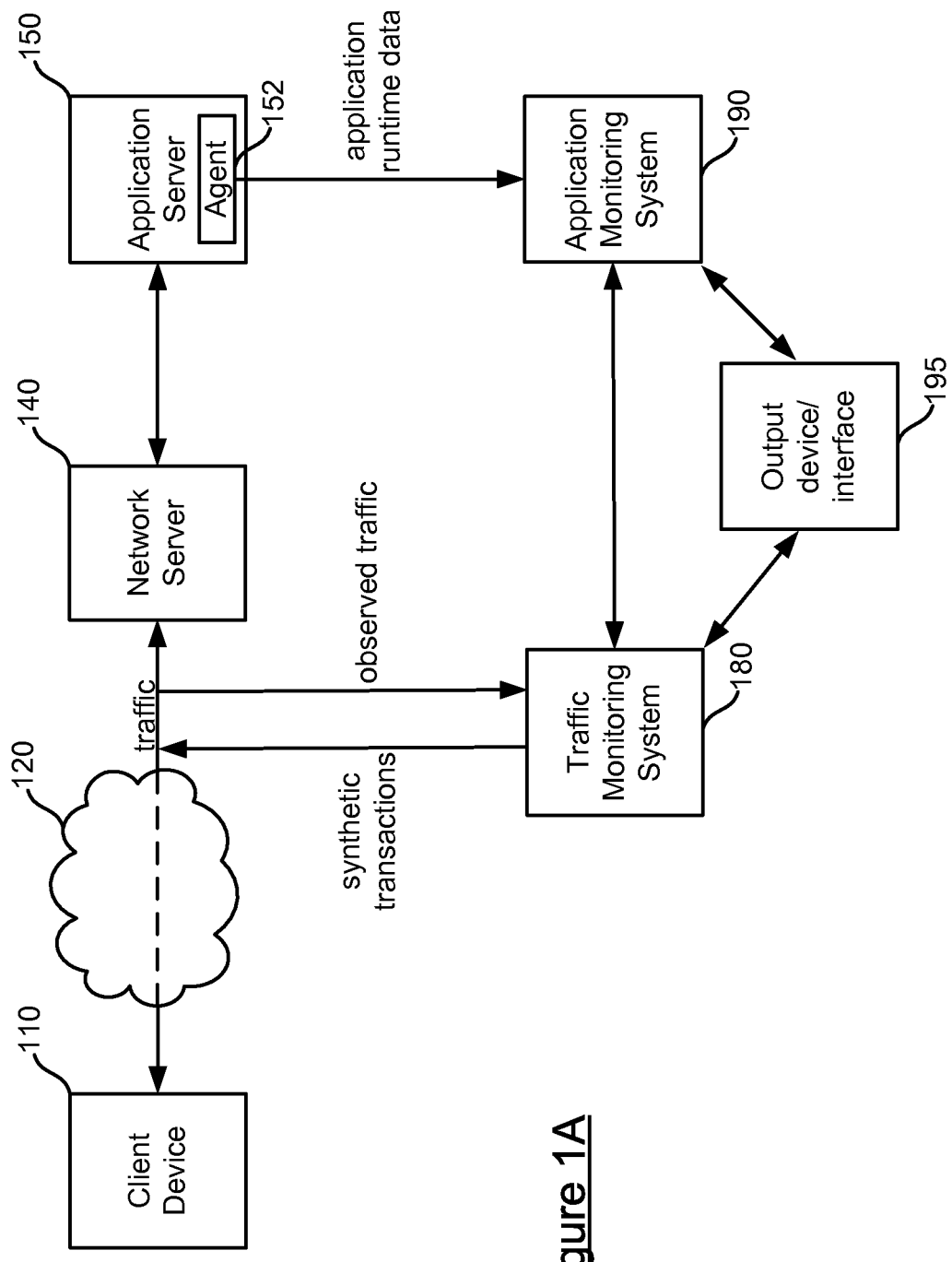
FIG. 1A is a block diagram of an embodiment of a network monitoring system which monitors a network service.

Data associated with a service level agreement (SLA) is automatically correlated to data associated with an operating level agreement (OLA) for a network service. A network service is monitored during runtime by a network service monitoring system comprised of a traffic monitoring system and an application monitoring system. The network service monitoring system processes data derived and/or generated from monitoring the network service to determine if an SLA and/or OLA for the network service is satisfied. Data associated with any failed SLA and one or more related OLAs is then correlated together using a common data hierarchy.

The traffic monitoring system may monitor the traffic experienced by the network service and generate traffic monitoring data from the observed traffic. The application monitoring system may monitor applications that process the network service traffic and generate application runtime data from monitoring the applications. Both the traffic monitoring data and application runtime data can be structured according to a hierarchy based on business transactions.

An SLA may be tested against traffic monitoring data or application runtime data. Similarly, an OLA may also be tested against traffic monitoring data or application runtime data. The traffic monitoring data may be generated by the traffic monitoring system and the application runtime data may be generated by the application monitoring system. Since both the traffic monitoring data and application runtime data can be organized with a similar data hierarchy, the traffic monitoring data associated with a business transaction may be correlated to application runtime data associated with the same business transaction. The correlated traffic monitoring data and application runtime data may also be associated with an SLA and one or more OLAs. This is discussed in more detail below.

A traffic monitoring system or other system may generate an SLA for handling a network service transaction between a user and the network service. In one embodiment, the SLA may be defined from transaction definitions. Transaction definitions may specify a transaction for a particular user, a type of transaction, a set of transactions that form a business process, or other transaction information. The transaction definitions may be generated from previously monitored transactions or in some other manner. The SLA may have SLA parameters that indicate the level of service that the network service should provide when handling the transaction. The SLA parameters which describe the level of service may relate to traffic monitoring data (e.g., response time, success rate, and other data within the traffic monitoring data). In one embodiment, the SLA parameters may include service level thresholds that should be met, a period of time over which to measure compliance of the thresholds, transaction identification information to identify the transaction(s) subject to the SLA, and other data. If the SLA is not satisfied by a service level provided by the network service, an SLA violation event is triggered.

An application monitoring system or other system may generate an OLA for a transaction between an application and a backend. In some embodiments, the transaction between the application and backend is performed to process a request received by the application from a network server. In some embodiments, an OLA may be generated between other entities as well. The OLA may be generated from observed transaction relationships between an application and backend during runtime, a list of known transaction relationships between network service system components, or in some other manner. The OLA may include OLA parameters which specify operating level thresholds to be satisfied when processing the transaction, a period of time over which the thresholds should be satisfied, application-backend transaction identification information, and other data. If an OLA is not satisfied by the service level provided by the backend in responding to the application request, an OLA violation event is triggered. The service level provided by a backend to an application can be determined from application runtime data generated in response to monitoring the application in communication with the backend.

Network Service Monitoring

The present technology may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

The network service monitoring system may include multiple monitoring systems such as, in one embodiment, a traffic monitoring system and an application monitoring system. The traffic monitoring system may observe network traffic sent and received by a network service, may have a variety of architectures and may monitor traffic provided according to any type of network protocol. The observed traffic may be processed as discussed in more detail below to provide traffic monitoring data. An example network monitoring system is discussed below in connection with FIG. 1A. Logical operation of a traffic monitoring system is discussed below with respect to FIG. 1B.

The application monitoring system may monitor the execution of one or more applications of the network service. For example, the application monitoring system may monitor the performance of one or more applications and/or application components and generate corresponding application runtime data which identifies, e.g., components which are invoked in one or more execution paths such as threads and/or processes of the application. For example, the components can include servlets, Java Server Pages, Enterprise Java Beans, Java Database Connectivity components and/or Microsoft .NET components. The application runtime data can provide a transaction trace, for example, which indicates the time intervals in which the components were invoked. Logical operation of an application monitoring system is discussed in more detail below with respect to FIG. 1C.

Processing observed traffic and application runtime data may include associating the two types of data so that related traffic monitoring data and application runtime data can be correlated and selectively accessed. In this way, an operator can quickly navigate through the data to obtain relevant information, such as information for diagnosing an anomalous condition.

Thus, an operator may obtain information regarding network service performance "from the outside" by viewing the observed traffic (e.g., from the perspective of a client interacting with the network service) as well as "from the inside" (e.g., from the perspective of the execution of components of the application). By viewing a network service from the inside and outside, the operator has more information from which to monitor, manage and diagnose the performance and health of a network service.

For example, the traffic monitoring data can characterize a user's interaction with an application from the user's perspective, that is, by answering the question: "What is the impact of the application on the user?" The application runtime data can characterize the application from a perspective of individual software components that are invoked in the application. Such component level data allows a programmer or other specialists to diagnose a problem and implement a fix, e.g., by patching or otherwise revising the application, repairing or replacing hardware, reallocating resources, etc. The traffic monitoring data and application runtime data can also be used separately, in a non-integrated manner. Generally, the application runtime data focuses on diagnosis of a problem, e.g., finding the root cause of a problem, while the traffic monitoring data focuses on user impact.

Further, traffic monitoring data and application runtime data can be classified according to one or more hierarchies which characterize client interactions with an application. For instance, a hierarchy may characterize the interactions according to a business model for an e-commerce application. This allows the traffic monitoring data and application runtime data to be presented in a user-friendly manner which is tailored to the needs of a particular organization and individuals in the organization.

FIG. 1A is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such a server. Application server 150 processes the request received from the network server 140 and sends a corresponding response to the client device 110 via the network server 140.

The network monitoring system also includes traffic monitoring system 180 and an application monitoring system 190. In one possible approach, the application monitoring system uses one or more agents, such as agent 152, which is considered part of the application monitoring system 190, though it is illustrated as a separate block in FIG. 1A. Traffic monitoring system 180 observes traffic sent between client device 110 and network server 140, including requests sent from client device 110 and corresponding responses received by the client device 110. Agent 152 and application monitoring system 190 monitor the execution of one or more applications at the application server 150, generate application runtime data, which represents the execution of components of the application responsive to the requests, and process the generated application runtime data. In some embodiments, application monitoring system 190 may be used to monitor the execution of an application or other code at some other server, such as network server 140. An output device/interface 195 may communicate with the traffic monitoring system 180 and the application monitoring system 190 for presenting reports and other data to an operator and for receiving inputs from the operator. Output device/interface 195 may or may not be a single shared interface. For example, each system may have an interface which may or may not be shared. The traffic monitoring system 180 and the application monitoring system 190 may have independent interfaces or may share a common interface.

Figure 1B:
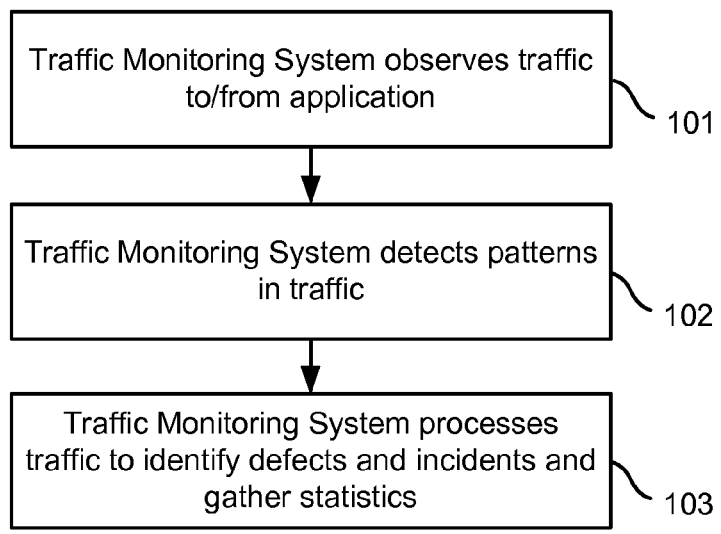
FIG. 1B illustrates a flowchart of an embodiment of a process by which a traffic monitoring system monitors traffic.

FIG. 1B illustrates a flowchart of an embodiment of a process by which traffic monitoring system 180 of FIG. 1A monitors traffic. Note that in this and the other flowcharts provided, the steps indicated are not necessarily performed one at a time in the order indicated, but may occur simultaneously, at least in part, and/or in another order. Traffic sent to and from an application, such as traffic sent between client device 110 and web server 140 over network 120, for instance, is observed by traffic monitoring system 180 at step 101. The observation can involve passively copying the traffic at some intermediate point between the client and the application via a tap or mirror port, for instance, or intercepting the traffic, copying the intercepted traffic and relaying the intercepted traffic it to its intended destination.

At step 102, the traffic monitoring system 180 detects patterns in the traffic and may use this information to group traffic into an object hierarchy. For example, this can involve recognizing application requests and responses, relating or binding corresponding request-response pairs into transaction components (for example an HTML file or an image file), binding transaction components into transactions (for example a web page with an HTML file and zero or more image files), binding transactions into user-specific tasks that may be called business transactions (for example an application's login business transaction may retrieves one or more web pages). Similarly, business transactions can be bound to a business process, and business processes can be bound to a domain. The domain, business processes, business transactions, transactions and transaction components may be part of one or more hierarchies which are defined for classifying the observed traffic. A business process includes one or more business transactions, and a domain includes one or more business processes.

Also, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used with a session identifier, where only transactions or transaction components sharing a common session identifier may be bound together. Further related information can be found in U.S. patent app. publication no. 2003/0191989 to P. O'Sullivan, published Oct. 9, 2003, titled "Methods, systems and computer program products for triggered data collection and correlation of status and/or state in distributed data processing systems," and incorporated herein by reference.

Transactions can be detected based on transaction definitions which specify the existence or non-existence or combination thereof of a set of name/value pairs, e.g., parameters, which are found in the traffic. For example, parameter specification may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Session managers, such as the eTrust® SiteMinder available from CA, Inc., Islandia, N.Y. uses a cookie parameter to hold an encoded or encrypted value, which in turn holds session specific name/value pairs. Session parameters include name/value pairs that appear in such an encoded or encrypted value. Name and value specifications may specify an exact value for exact matching or a pattern for pattern matching. Any form of pattern matching may be used, from simple wild-card pattern matching to more complex regular expression pattern matching.

In particular, an operator can define a hierarchy for organizing the traffic monitoring data which is obtained by the traffic monitoring system, e.g., through an interface or other means. For example, an operator may use an interface to generate the hierarchy from a set of parameters obtained from the observed traffic. The parameters can be designated as belonging to one or more levels of the hierarchy as discussed in more detail below with respect to FIG. 3 and FIG. 10B. In this manner, traffic monitoring data can be accessed according to the classification provided by the hierarchy to facilitate diagnosis of anomalies and understanding of application and network performance.

At step 103, the traffic monitoring system processes the traffic to identify defects and incidents and gather statistics. A defect generally indicates an anomalous condition of a request-response pair. Moreover, an incident can be set when one or more related defects are set. An incident may be a cause for concern which should be analyzed further. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may be sufficient to set an incident.

In one approach, defects can be detected by evaluating a request-response pair against defect criteria which may specify transaction types, a range of acceptable response times, and/or other parameters, for instance. For example, when the defect criteria specifies a range of acceptable response times within which a response may be received after a request is sent, the request-response pair is defective if the response time falls outside the specified range. Similarly, when the defect criteria specify a range of unacceptable response times, the request-response pair is defective if the response time falls within the specified range. Moreover, defect criteria can be specified for transaction components, transactions and/or business transactions.

Furthermore, defect data and statistics can be aggregated for a number of request-response pairs and classified according to the hierarchy. The aggregated statistics and defects can then be processed to enable other functionality of the present technology and stored for access by an operator through an interface or other appropriate output.

Figure 1C:
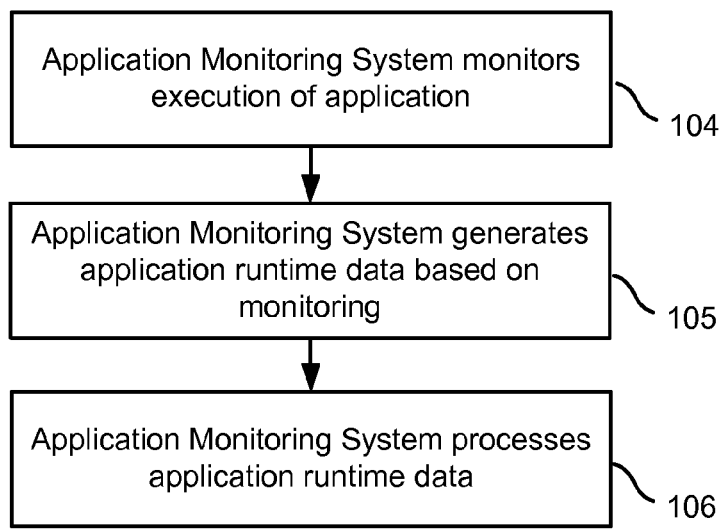
FIG. 1C illustrates a flowchart of an embodiment of a process by which an application monitoring system monitors an application.

FIG. 1C illustrates a flowchart of an embodiment of a process by which the application monitoring system 190 of FIG. 1A monitors an application. An application is monitored by application monitoring system 190 at step 104. Monitoring may involve agent 152 determining which components of application server 150 are invoked and the duration in which they are invoked when the application processes a client request, as discussed in more detail below with respect to FIG. 4 and FIG. 11.

Application runtime data based on the monitoring of the application is generated at step 105. The generated application runtime data can indicate the application components involved in processing a request, the duration that each component consumed in processing a request, and other information. The application runtime data can be generated by agent 152, in one possible approach, after which the agent 152 may forward the generated application runtime data to application monitoring system 190, which can exist outside of application server 150, in one embodiment. Generating and reporting application runtime data is discussed in more detail below with respect to FIG. 4 and FIG. 11.

The application runtime data is processed by application monitoring system 190 at step 106 such as by aggregating the data, storing the data, and providing the data to an operator through an interface or other output.

Further, traffic monitoring system 180 and application monitoring system 190 may communicate with each other to enable association of the traffic monitoring data and application runtime data. The association allows an operator to access information which characterizes the network service from the "outside" via the traffic monitoring data and from the "inside" of the network service via the application runtime data. This provides the operator with a powerful insight into how a network service processes requests (the inside perspective) and the effect of the network service on a customer or other user or network component (the outside perspective).

In some embodiments, the traffic and application monitoring systems may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance.

In one embodiment, integrating the data allows business information associated with a number of web service requests and corresponding responses to be associated with application runtime data. For example, consider a number of requests received daily by a web service of a bank to open new user accounts. The integrated traffic monitoring and application runtime data may provide aggregated information regarding the content of the requests and responses and timing information (e.g., response times) for the transactions from the requesting users' point of view, as well as detailed information regarding the execution of the application such as information regarding application components which are invoked and timing information regarding how the requests were processed and the responses were generated. Generally, application runtime data can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. The traffic monitoring data and application runtime data can be aggregated over many requests and responses to obtain valuable trend information without the need to save data for each specific request and response. However, traffic monitoring data and application runtime data for a specific request and response can be saved, e.g., if an anomalous condition is detected, to allow a detailed analysis of a specific request-response pair on an as-needed basis. The integrated data may be accessed through the traffic monitoring system, the application monitoring system or some other system, and/or provided to another system, device or program code for further processing.

In some embodiments, application runtime data received by Enterprise Manager 155 may be generated by agent 152 in response to tracing application transactions. This tracing may correlate inbound requests, such as a URL request, to an outbound backend request, such as a call to database or other system. To perform this tracing, agent 152 may leverage a blame technology to identify component interactions and component resource usage. Blame technology tracks specified components using concepts of consumers and resources. Consumers request some activity while resources perform the activity. In some cases, a component can be both a consumer and a resource, depending on the context and the operations it performs.

In one embodiment, consumers and resources are reported in a tree-like manner by agent 152 in a stack called a Blame Stack. During a transaction, when a component is entered it is pushed onto the stack. When a component is exited, the component is removed from the stack. In some embodiments, a single blame stack represents a single transaction. Sub-elements are Blame Stack entries for other components (e.g. methods, process, procedure, function, thread, set of instructions, etc.) that are started from within the transaction of interest.

In some embodiments, the transaction tracing and blame technology may be used to associate a URL request (or other network server request) received by an application with corresponding calls made by the application to one or more backends (a server, machine or other system such as database 151 that may process requests from an application) to process the URL request. For example, network server 140, when implemented as a web server, may receive a request for a URL that requires processing by application 151 of application server 150. Web server 140 may send a request to application 151 to process the URL request. In processing the URL request, application 151 may first process the request by a servlet (component A), which then invokes an Enterprise Java Bean (EJB) (component B), which invokes another EJB (component C), which places a call to backend 120. Thus, from the perspective of application 151, the request is processed as follows:

URL request→Component A→Component B→Component C→Backend.

Thus, a URL request is received by component A, which then invokes component B, which invokes component C which then invokes a backend server. Components A-C are contained within an application such as application 151. Using boundary blame technology to trace the transaction, the transaction processing can be represented as URL request→Application A→Backend, or even simpler as:

URL request→Backend.

Thus, the Blame technology can be implemented in agent 152 to identify what URL requests are eventually processed by a particular backend. In some embodiments, agent 152 may report data in string format such as the pseudo-data below:

Application A: URL B: called Backend C: Average Error Rate X, wherein Application A is the application that received URL request B from a network server, backend C is called by application A to process the request, and the average error rate over a period T (for example, 15 seconds) for the backend when processing application A requests is X. Other metrics such as response time, stalls, and others may be used as well.

It will be understood by those in the art the performance data can have many formats, and the pseudo-data string above is only an example of one of many possible formats for reporting metrics.

While the embodiment described herein includes the use of Blame technology and a stack, other embodiments of the present invention can use different types of stack, different types of data structures, or other means for storing information about transactions. More information about blame technology and transaction tracing can be found in U.S. patent application Ser. No. 10/318,272, "Transaction Tracer," filed on Dec. 12, 2002, incorporated herein by reference in its entirety.

Below, an architecture for a traffic monitoring system and application monitoring system is discussed generally and then in more detail with respect to FIGS. 1D-5. Operation of the monitoring systems is discussed with respect to FIGS. 6-11. Exemplary methods of integrating traffic monitoring data and application runtime data are discussed with respect to FIGS. 12A-13.

Figure 1D:
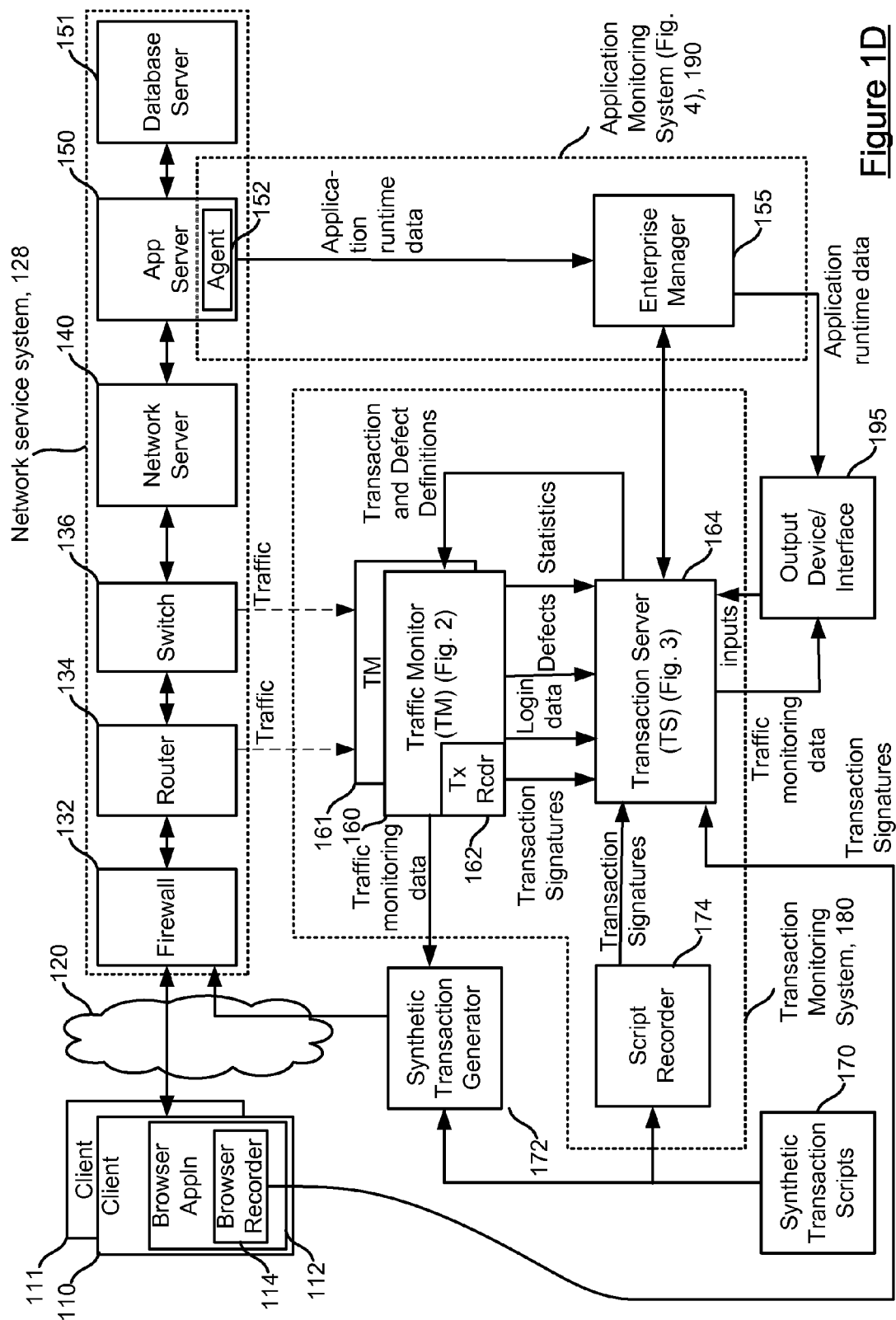
FIG. 1D is a block diagram of an embodiment of a system for monitoring a network service.

FIG. 1D is a block diagram of an embodiment of a system for monitoring a network service. A network service system 128, traffic monitoring system 180, and application monitoring system 190 are provided. The network service system 128 includes firewall 132, router 134, switch 136, network server 140, application server 150 and database server 151. Client 110 may send requests to and receive responses from the network service system over one or more networks such as network 120. Traffic monitoring system 180 collects data regarding network service system traffic and application monitoring system 190 collects data regarding execution of the application at the application server 150.

In the embodiment illustrated, client 110 includes browser application 112, which may be implemented, e.g., as a web browser or other network browser. In some embodiments, browser application 112 may include browser recorder 114 which records browser requests, headers and content data received from network server 140, translates the browser content data into transaction signatures, and transmits the signatures to transaction server 164. Transactions signatures and recorders are discussed in more detail below. In some embodiments, more than one client, as illustrated by additional client 111, may communicate with network server 140 to send traffic to and receive traffic from network server 140. In some embodiments, a client can be a server computer or other computer. In this case, requests need not originate from a browser or as a result of human interaction. In any case, the recorder 114 can record requests, headers and content for the client device.

Traffic sent over network 120 from client 110 may pass through firewall 132, router 134 and switch 136 before reaching network server 140, in one possible network topology. In practice, more complex or less complex topologies may be used. Firewall 132 may be implemented as a set of one or more related programs located on a network gateway server that protects the resources of the servers and devices inside a private network. Incoming traffic received by firewall 132 can be analyzed to determine if it is safe before it is sent toward network server 140.

Router 134 may be implemented as a device or software within a device and can be connected to more than one other device. Router 134 determines the next network point or device to which an information packet should be forwarded based on its understanding of the state of the network or networks to which it is connected. Switch 136 channels incoming data from any of multiple input ports to the specific output port that will take the data towards its intended destination, e.g., based on an Internet Protocol or IP address in each received packet.

Traffic sent by client 110 is received by network server 140 and may be processed by network server 140. Network server 140 may optionally send requests to one or more other servers to process the received traffic, such as application server 150, database server 151 or other backend servers (not illustrated in FIG. 1D). In response to a request received from browser application 112, network server 140 provides a response with web page content, for instance, to browser application 112. Network server 140 is in communication with client 110 (through devices 132-136) and with application server 150. Application server 150, which can include one or more application programs that provide business logic, for instance, is in communication with network server 140 and database server 151. Database server 151 is in communication with application server 150 and stores network service system information and other information for responding to client requests. The stored information is configured to be accessed, managed and updated by application server 150 and other devices and/or programs.

The network service system processes a request received from client 110 such as by sending the request to application server 150 which, in turn, generates a response and provides it to network server 140. In some cases, application server 150 may access database server 151 or some other backend server to process the request. Network server 140 transmits the response to the client 110 through switch 136, router 134, firewall 132 and network 120.

Traffic monitoring system 180 may monitor the traffic associated with the request and corresponding response at any desired location such as between client 110 and network server 140. Traffic monitoring system 180 includes traffic monitor (TM) 160, transaction server (TS) 164, script recorder 174, and browser recorder 114. In some embodiments, there may be more than one traffic monitor, as illustrated by additional traffic monitor 161. In one approach, each traffic monitor can monitor a different server, such as a web server or application server. Moreover, the monitoring duties may be divided among multiple monitors according to different ranges of network addresses. One or more traffic monitors may report information to transaction server 164. Thus, one transaction server may receive information from more than one traffic monitor, in one approach.

Traffic monitor 160 observes the traffic and can perform tasks such as determining whether portions of the traffic qualify as a defect, identifying user information in a transaction, and generating defects and statistics information. Traffic monitor 160 may observe the traffic at router 134, e.g., through a passive tap, at switch 136, e.g., via a mirror port, or some other point in the route traversed by the traffic. Traffic monitor 160 is described in more detail below with respect to FIG. 2.

Transaction server 164 receives login data, statistics and defects information from traffic monitor 160, receives transaction signatures from one or more recorders, generates transaction and defect definitions, provides the definitions to traffic monitor 160, and provides traffic monitoring data to an operator regarding the observed traffic. Transaction signatures provide information for transactions monitored by a particular recorder and are used by transaction server 164 to generate transaction definitions and defect definitions. Transaction server 164 provides the definitions to traffic monitor 160 for use in detecting transactions and determining whether they are defective. The transaction data may be provided to an operator through an output device/interface 195 to allow the operator to view reports with traffic monitoring data and application runtime data, generate and modify transaction and defect definitions, and perform other tasks. Transaction server 164 is discussed in more detail below with respect to FIG. 3.

The transaction signatures received by transaction server 164 can be sent by one or more transaction recorders. A transaction signature is a set of data that describes a particular transaction. In one embodiment, a transaction includes one or more request-response pairs. For example, a transaction may include a request by a client browser application for a login page from a web service system, and the corresponding response from the system that includes the login page content to be rendered by the client browser. The transaction signature that describes the transaction may include the request header data, request body data, the user data contained in the request, a request identifier, the source of the request, the recipient of the request, and corresponding information in the response (e.g., header, body, source of response, intended recipient).

An operator may use an interface to generate transaction definitions from transaction signatures, e.g., by viewing transaction signature data through the interface, modify the transaction signature data if desired, and selecting or "promoting" the transaction signature data to a transaction definition. The transaction definition may then be used to identify valid transactions in subsequently observed traffic. For example, assume a user "Bob" is logging on to a corporate intranet site to submit a form to the human resources department. Transaction definitions can be set which identify Bob's login transaction and the form submission transaction as two distinct transactions. Moreover, the promotion can also remove "Bob" as a specific user. Generating transaction definitions from transaction signatures is discussed in more detail below.

One or more recorder can be used to provide the transaction signatures by capturing transaction data (for example, a request observed at a client which generated the request or observed in network server system traffic), translating the transaction data into transaction signatures, and transmitting the signatures to transaction server 164. For example, a client request can be translated into a transaction signature by extracting identification parameters such as HTTP parameters (name/value pairs) from the request. Moreover, different types of recorders can be used, such as comprehensive recorders, standard recorders, and script recorders. A comprehensive recorder may be implemented on any machine, such as an administrator console or a machine which performs live transactions. For example, the transaction recorder (Tx Rcdr) 162 which is provided as part of the traffic monitor 160 may be considered to be a comprehensive recorder. A standard recorder may be implemented on the same machine which performs live transactions (such as within a browser). For example, the browser recorder 114 may be considered to be a standard recorder. Script recorders, such as script recorder 174, use pre-recorded network packet capture files and test script output files to create transaction signatures.

In one embodiment, transaction server 164 receives transaction signatures from browser recorder 114 within browser application 112, script recorder 174, and transaction recorder (Tx Rcdr) 162 within traffic monitor 160. Browser recorder 114 may be a standard recorder or a browser plug-in. The browser plug-in records a web page and page components as they are loaded into browser application 112. Browser recorder 114 then translates the page and page components into a transaction signature and transmits the transaction signature to transaction server 164. Transaction recorder 162 records transaction signatures from monitored traffic. Script recorder 174 may receive transaction scripts. A transaction script is a set of script commands that can be executed to perform one or more transactions at a client communicating with a network system. For example, a transaction script may include script commands to request a network service login page, and provide login user information in response to receiving the login page. In some embodiments, each script command may also include parameters and other data to complete each request. For example, a login request may include data for a user name and password. In some embodiments, the transaction scripts may be provided in a log file or some other script file. Script recorder 174 translates the transaction scripts into transaction signatures and transmits the signatures to transaction server 164. One example of a script recorder uses a script generated by "Mercury LoadRunner," software, available from Mercury Interactive Corporation, of Mountain View, Calif.

Transaction server 164 may also communicate and exchange information with Enterprise Manager 155 such as hierarchy information, statistics and defects information and other information, as discussed in more detail below.

Application monitoring system 190 may monitor execution of an application based on the traffic received by the application, generate application runtime data and process the generated data. As discussed above with respect to FIGS. 1A and 1C, application monitoring system 190 may include Enterprise Manager 155 and Agent 152 and is in communication with application server 150 and traffic monitoring system 180. Application monitoring system 190 is discussed in more detail below with respect to FIG. 4.

Output device/interface 195, which may include an on-screen interface, for instance, may receive traffic monitoring data from traffic monitoring system 180 and application runtime data from application monitoring system 190 for access by an operator. The interface 195 also allows the operator to provide inputs to the transaction server 164, e.g., to provide transaction definitions or other configuration settings.

Synthetic transaction generator 172 may generate synthetic transactions for network server 140, e.g., in response to receiving synthetic transaction scripts from synthetic transaction script module 170. The synthetic transaction scripts can also be received by script recorder 174, which records the scripts, translates the scripts into transaction signatures, and forwards the generated transaction signatures to transaction server 164. The synthetic transaction generator 172 may be provided as part of the traffic monitoring system or as a component that works with the traffic monitoring system and/or the application monitoring system. The synthetic transactions may be injected into the traffic received by network server 140. Generating synthetic transactions may begin with observing traffic for a network service, and determining the scope and frequency of the traffic, in particular, the scope of a network functionality tested by the observed traffic as well as the frequency with which the traffic scope is tested. Synthetic transactions may be generated to test network service functionality based on a comparison of actual traffic scope and/or frequency to target scope and/or frequency. For example, if a particular function of an application is not being tested frequently enough by the actual users of the network service, synthetic transactions can be generated to test the function. In some embodiments, the synthetic transactions may also be based on application runtime data which may be processed to determine the scope and frequency with which application components are tested by the observed network traffic.

Figure 2:
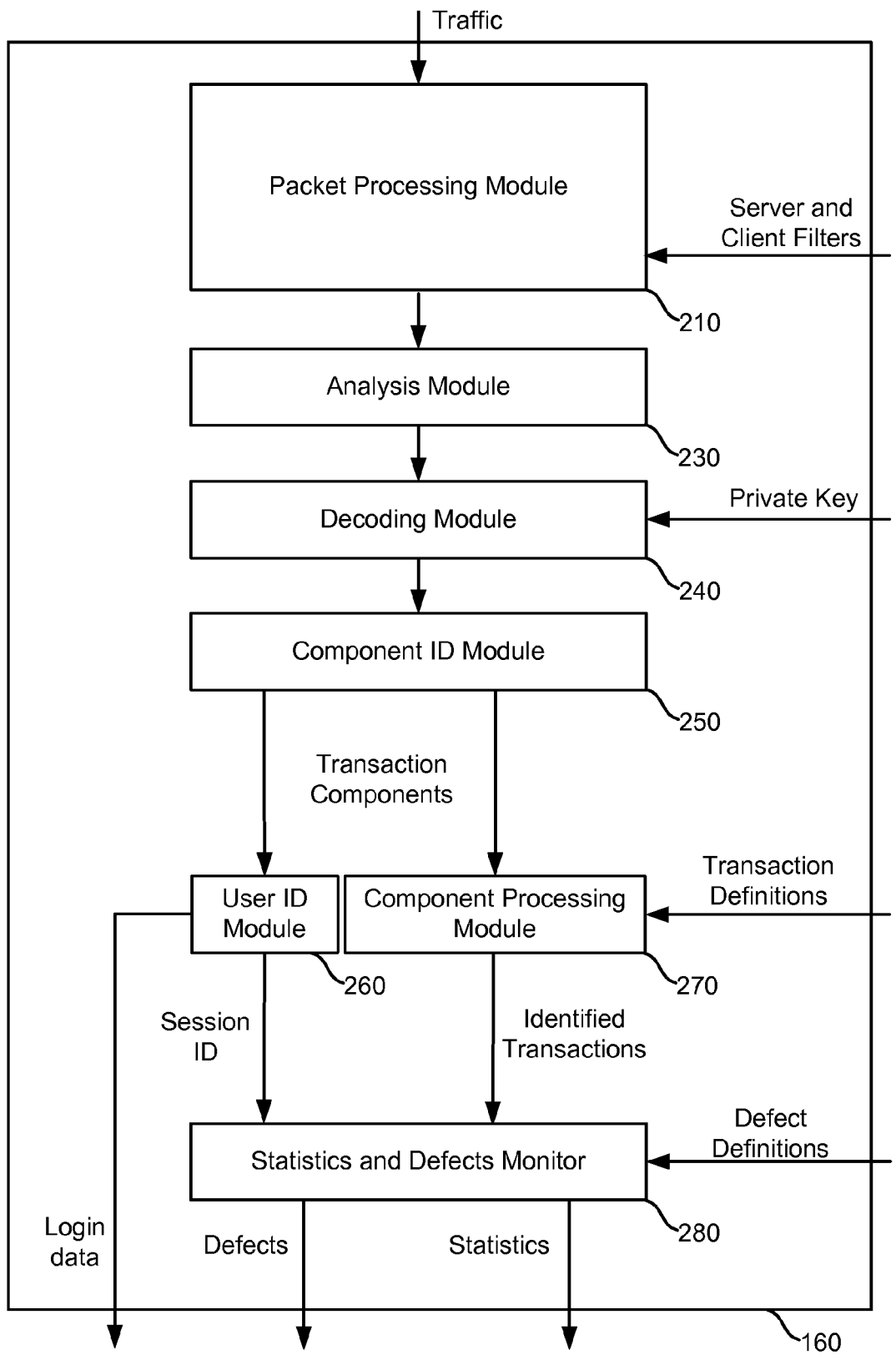
FIG. 2 is a block diagram of an embodiment of a system for processing network traffic.

FIG. 2 is a block diagram of an embodiment of a system for processing observed network traffic. In one embodiment, FIG. 2 provides detail of software modules for implementing the traffic monitor 160 of FIG. 1D. Operation of traffic monitor 160 is also discussed with respect to FIGS. 8 and 9.

As discussed above, traffic monitoring system 180 may be used to observe and process network traffic using any protocol, including but not limited to HTTP and HTTPS. Portions of the discussion below that reference HTTP and/or HTTPS, or any other protocol, are provided for purposes of example and should not be construed to limit application of the present technology.

Traffic monitor 160 includes packet processing module 210, analysis module 230, decoding module 240, component ID module 250, user ID module 260, component processing module 270 and statistics and defects monitor 280. Packet processing module 210 captures and filters traffic packets. In some embodiments, observing traffic may include receiving a copy of the traffic which is received by router 134, switch 136 or some other point in the path of traffic between client 110 and web server 140. In some embodiments, traffic may also be observed at a device existing between network server 140 and application server 150, or between application server 150 and database server 151. The observed traffic may be received as unordered packets of traffic provided according to HTTP, HTTPS or some other format. Packet processing module 210 may also receive one or more server and/or client filters for filtering the captured traffic as discussed in more detail below with respect to FIG. 8.

The analysis module 230 may reconstruct a data stream according to its format, e.g., TCP/IP, from filtered unordered packets received from packet processing module 210. The reconstructed data stream may include requests and responses. For example, request-response pairs can be detected in the data stream. A request-response pair can include a request provided by a client to an application and a corresponding response provided by the application to the client. For instance, the request can be a request for a component of a web page such as an image, a cascaded style sheet, or a JavaScript component.

Decoding module 240 decodes the reconstructed data stream provided by the analysis module when it is an encoded data stream. For example, a data stream may be encoded if it is generated from a stream of packets sent over a secure socket layer connection, e.g., using HTTPS or some other secure protocol. The decoding may be performed using a private key received or otherwise accessed by decoding module 240.

Component ID module 250 receives a reconstructed data stream from analysis module 230 (or decoding module 240 if the stream was encoded), identifies transaction components within the stream such as by identifying name/value pairs and provides the transaction components to a user ID module 260 and a component processing module 270. Further details regarding the component ID module 250 are provided below in connection with FIG. 8.

User identification (ID) module 260 receives the transaction components from component ID module 250 and identifies a session ID and/or user ID from the received components. In some embodiments, a user ID is derived from a login transaction as part of a business transaction. The user identification module 260 then provides the session ID and/or user ID to the statistics and defects monitor 280.

In one approach, a session identifier can be related to one or more transactions. For example, in a web application, the session ID is carried in the observed traffic as a cookie in every packet. The session ID in the packets related to the transaction may be related to the transaction itself. A single session identifier may be bound to one or more transactions. Session attributes, for example, session priority, may also be associated with transactions through this session-to-transaction binding mechanism.

Further, a user identity can be related to transactions. A user ID may be identified and associated with a session by examining and parsing a login transaction for user identity information, for example. In those cases where the login transaction possesses a session identifier, for example, this session ID may be used to establish a relationship between the user ID and the session ID, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user-to-session binding mechanism and through the user-to-session-to-transaction binding mechanism. User attributes may be retrieved from an external system, for example, by using user identity information to look up user attributes in an X.500 directory, a LDAP directory, and/or a single sign-on system.

Component processing module 270 receives the transaction components from component ID module 250 and processes them to identify associated transactions using transaction definitions received from transaction server 164. A transaction can refer to a series of related network communications that perform a function. For example, the retrieval of a web page may involve one or more transactions. Moreover, a transaction definition may indicate that a particular transaction component is a "primary" component of a particular transaction. In some cases, this can be the first transaction component in a set of transaction components that make up a transaction. The presence of the primary component indicates the presence of the associated transaction. The other transaction components in the definition of a transaction can be considered to be secondary components. For example, if a transaction component within a transaction has a key/value pair indicating an action of "login," then the transaction is a login transaction. The secondary components are also part of the login transaction. The use of primary components to identify transactions can improve efficiency but is not necessary.

The received components are compared to the transaction definitions to identify transactions to be further processed by the traffic monitoring system. Transactions are selected to be processed further if the components conform to one or more of the transaction definitions. In one embodiment, the comparison determines if the received components have a URL which matches a URL in the transaction definitions. The components which match the transaction definitions are combined into transactions and provided to statistics and defects monitor 280 to be processed further. The components that do not match any transaction definitions can be discarded, ignored, identified as "not classified," or otherwise processed.

In addition to identifying transactions based on transaction components, component processing module 270 can identify a business transaction which includes a set of associated transactions. Generally, different logical constructs of a hierarchy can be identified from the transaction components. At higher levels of the hierarchy, a business process which refers to a series of related business transactions, and a domain which refers to a series of related business processes, can be defined using corresponding definitions. A business process can include a set of associated business transactions which have a common session identification, for instance. To illustrate, a business process class for buying a book from an e-commerce web site can be defined. This business process class can include classes of business transactions such as login, shopping, add to cart and checkout. A particular use of the login process, for instance, by a particular user at a particular time represents an example of an instance of the login business transaction. The login business transaction instance may include transaction component instances which provide a user identifier (user ID), a URL for a login page, and a session identifier (session ID). The component processing module provides the identified transactions to the statistics and defects monitor 280.

Further, multiple business process hierarchies may be built on top of a single business transaction/transaction/transaction component hierarchy. Also, users may be part of a user group hierarchy. Users groups may be part of a higher level user group hierarchy. Multiple user group hierarchies may be built on top of the user identification.

Statistics and defects monitor 280 receives session ID data from user ID module 260, identified transactions (transactions that match a transaction definition) from component processing module 270 and defect definitions from transaction server 164. In one embodiment, the defect definitions define criteria for determining whether the behavior of a transaction is acceptable. For example, a defect definition may indicate an acceptable response time for a component, error responses that are allowed or not allowed in response to a request, and other transaction data components required for a transaction. The identified transactions are analyzed based on the defect definitions to generate defects and statistics data. Generally, transactions are defective when they fail to meet quality standards. Moreover, the quality standards may be set for different levels of the hierarchy such as the business transaction, transaction or transaction component levels, for instance. Behavioral defects result from the behavior of a transaction failing to meet specifications. Slow transaction time, fast transaction time, low throughput, and incomplete transactions are examples of different types of behavioral defects. Response defects result from the response of a transaction failing to meet specifications. HTTP response codes (for example, HTTP 500-599 errors), unauthorized access, content analysis defects, and missing response defects are examples of different types of response defects.

The defect data indicates the number of defects found in the identified transactions over time, the type of defect and the number of defect transactions for each particular defect type. The defects may be reported per defective transaction with session identification information. In one embodiment, any identified transactions that conform to the defect definitions are designated as defects. Statistics data may include the number of transactions which occur, the type of transaction (for example, by URL), and other data. The statistics may be reported per hour, per transaction definition, per user and per session identification, for instance. Statistics and defects monitor 280 can report statistics and defect data for the identified transactions to transaction server 164.

Figure 3:
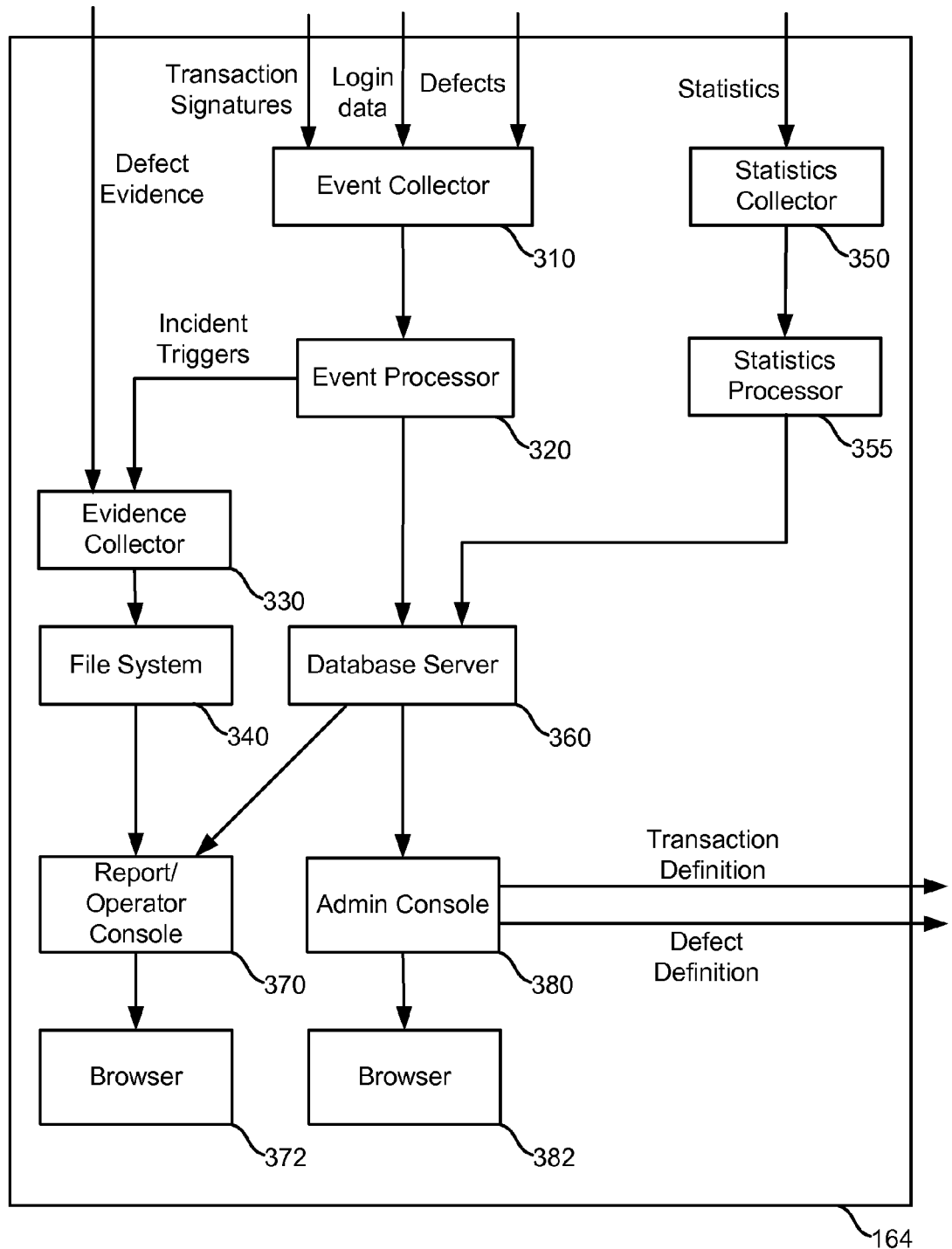
FIG. 3 is a block diagram of an embodiment of a system for receiving traffic information and generating traffic monitoring data.

FIG. 3 is a block diagram of an embodiment of a system for receiving transaction data and generating traffic monitoring data, e.g., transaction statistics, defect data, transaction definitions, and other data. In one embodiment, the system of FIG. 3 provides details regarding software modules for implementing transaction server 164 of FIG. 1D. Operation of transaction server 164 is discussed with respect to FIGS. 10A and 10B. Generally, transaction server 164 enables an operator to generate traffic classification logic, view traffic monitoring data reports, such as defect and incident reports, and provide transaction and defect definitions to traffic monitor 160.

Event collector 310, statistics collector 350, event processor 320, statistics processor 355, evidence collector 330, file system 340, database server 360, report/operator console 370, admin console 380, and browsers 372 and 382 are provided. Event collector 310 receives data including transaction signatures from recorders 114, 162, and 174 (FIG. 1D) and login data and defects from traffic monitor 160 as discussed above with respect to FIG. 2, and translates the received data into a format that can be processed by event processor 320. In one embodiment, event collector 310 generates objects, such as Java objects, from the received data and provides the objects to event processor 320. Event processor 320 processes the objects to provide database data to be stored at database server 360. In some embodiments, database server 360 may be implemented as an SQL database server. In one possible approach, the Java Database Connectivity (JDBC) API can be used for this purpose. JDBC enables Java programs to execute SQL statements to allow Java programs to interact with an SQL-compliant database.

Similarly, statistics collector 350 receives statistics data from traffic monitor 160, translates the received data into one or more objects, such as Java objects, and provides the generated objects to statistics processor 355. Statistics processor 355 processes the objects to provide database data to be stored at database server 360, again such as by using JDBC.

Event processor 320 may also generate incident triggers for use by evidence collector 330. An incident can be set when one or more related defects are set. An incident may be a cause for concern which should be analyzed further. An incident trigger is an event that informs evidence collector 330 when to collect evidence associated with defects. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may set an incident. In response to receipt of incident triggers, evidence collector 330 gathers evidence regarding defects and/or incidents and provides the evidence to file system 340. The evidence gathered can be any form of unstructured data collected from various resources (e.g., switches, routers, load balancers, web servers, application servers, database servers, etc.) Evidence collector 330 places gathered evidence into persistent storage. For example, in one possible approach, the evidence is placed in an evidence file (for example, in HTML format) and stored at the file system 340. For example, when a number of "slow transaction" defects trigger the business impact threshold of an incident, an evidence collection trigger can be sent from event processor 320 to evidence collector 330. Evidence collector 330 can execute any executable program, including a script to collect any form of evidence, for example, a script (Unix shell, Python, Perl, etc.) to retrieve a web log from the server performing the slow transaction and execute a Simple Network Management Protocol (SNMP) GET command on a router. The script then appends the content of the web log and the results of the SNMP query into a single evidence file. In some cases, the script may also reformat the content of the evidence file in a format for providing a display in a web browser such as by inserting various HTML tags into the evidence file.

A persistent store such as database server 360 may store transaction data and other data, e.g., based on data received from processors 320 and 355, for access by an operator user through operator console 370 and admin console 380 of transaction server 164. Note that the admin console 380 and the operator console can optionally be provided in the same console. Operator console 370 may be used to access and perform operations on data at the database server 360. Admin console 380 may provide an interface through browser 382 to allow an operator to view reports, define transaction and defect definitions from received transaction signatures and perform other tasks. Defining a transaction definition and defect definition is discussed in more detail below.

Figure 4:
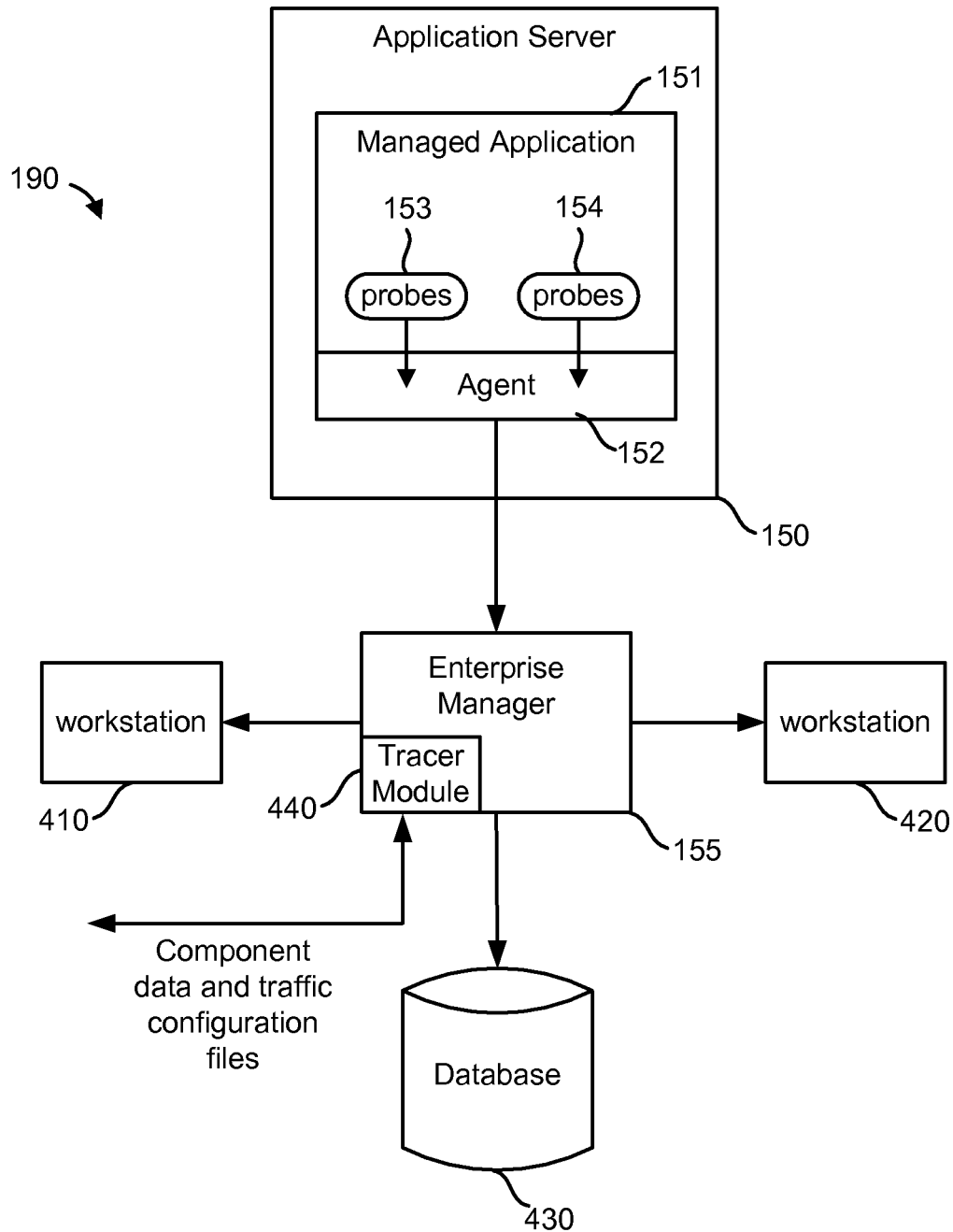
FIG. 4 is a block diagram of an embodiment of a system for monitoring an application.

FIG. 4 is a block diagram of an embodiment of a system for monitoring an application. As discussed above with respect to FIG. 1A, the application monitoring system 190 may be used to monitor an application and generate application runtime data. In one embodiment, FIG. 4 provides more detail for application server 150 and Enterprise Manager 155 of FIG. 1D. The system includes application server 150 which is in communication with Enterprise Manager 155 which, in turn, is in communication with example workstations 410 and 420 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g. modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety. See also FIG. 11.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 230 and 240 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 410 and 420 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections.

In one embodiment of the system of FIG. 4, one or more components are running on different computing devices. Alternatively, the components can run on the same computing device. A computing device on which each component may run is discussed in more detail below with respect to FIG. 5.

Enterprise manager 155 may also include tracer module 440 which may receive a hierarchy rules engine from transaction server 164 of FIG. 1D. In another approach, the tracer module 440 receives a configuration file which it parses to obtain the rules engine. In either case, the rules engine can be used to classify the application performance data according to different levels of the hierarchy. In one embodiment, the configuration file may include transaction server module identification, the date and time that the configuration file was created, application defect information, parameter defect lists and information regarding a domain, business processes associated with the domain, business transactions associated with the business processes, transactions associated with the business transactions and transaction components for each transaction. Further, for each of the business transactions, transactions and transaction components, defect definitions may be specified. Processing using a hierarchy is discussed in more detail below.

Figure 5:
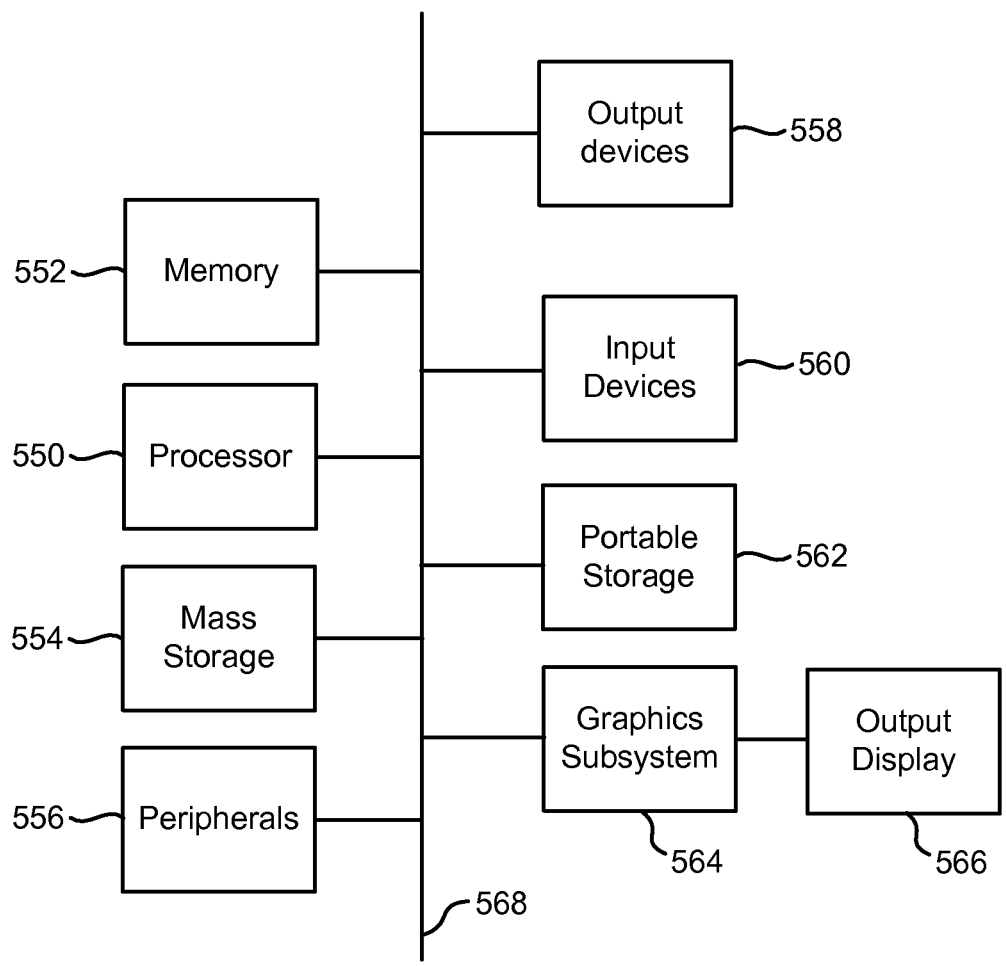
FIG. 5 is a block diagram of an embodiment of a computing system.

FIG. 5 is a block diagram of an embodiment of a computing system for use with the present technology. In one embodiment, the computing system may be used to implement client device 110, any of firewall 132, router 134 and switch 136 on one or more machines, network server 140, application server 150, database server 151, Enterprise Manager 150, workstations 410 and 420, database 430, traffic monitor 160, transaction server 164, synthetic transaction generator 172, script recorder 174 and synthetic transaction script module 170.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

Figure 6:
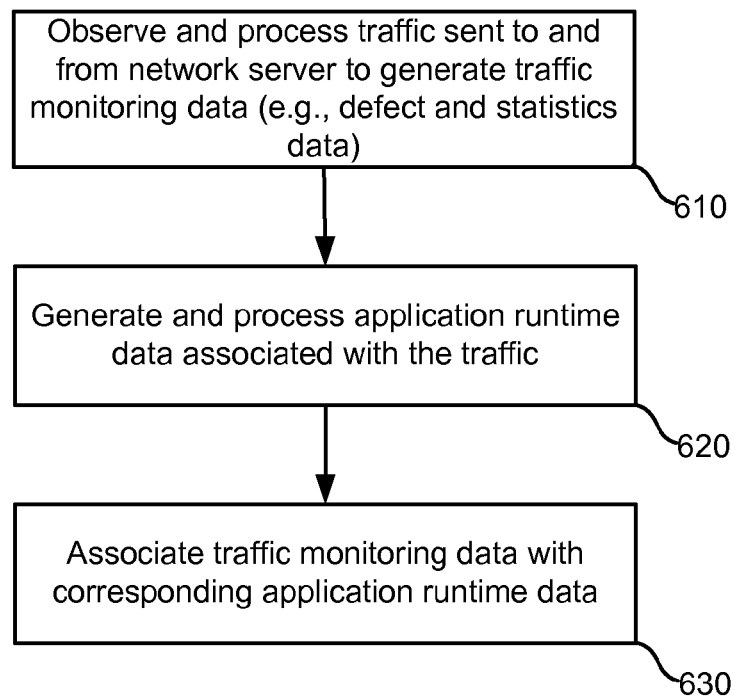
FIG. 6 is a flowchart of an embodiment of a process for monitoring a network service.

FIG. 6 is a flowchart of an embodiment of a process for monitoring a network service. The process can be performed by traffic monitoring system 180 and application monitoring system 190 of FIG. 1. The process begins with the traffic monitoring system observing and processing traffic sent to and from network server 140 to generate traffic monitoring data such as defects and statistics data, at step 610. In one embodiment, traffic may be received by a device in the line of communication between client 110 and network server 140. The device which receives the traffic sends a copy of the traffic to traffic monitoring system 180 while also forwarding the traffic to its intended destination. In particular, the traffic is received and processed by traffic monitor 160 and further processed by transaction server 164 of FIG. 1, e.g., to translate the traffic into transaction components, identify transactions from the transaction components, obtain statistics and defect data from the identified transactions, store transaction data and report information regarding the stored transaction data. Observing and processing traffic in step 610 is discussed in more detail below with respect to FIG. 7.

Application runtime data associated with the observed traffic is generated and processed by the application monitoring system at step 620. For example, the application may execute to handle a request from a network server to retrieve data from a database by sending a request to the database for the requested data, receiving the data in a response from the database, and sending the requested data to the network server in a response. For each of these actions performed by the application while processing the request, application runtime data can be generated, e.g., by the agent 152, and sent to Enterprise Manager 155 for processing. Step 620 is discussed in more detail below with respect to FIG. 11.

Traffic monitoring data can be associated with corresponding application runtime data at step 630. This can be achieved in different ways. For example, an identifier may be assigned by the application monitoring system to a request-response pair of a transaction component and provided to the traffic monitoring system in the response. Moreover, in some embodiments, the traffic monitoring system and the application monitoring system may use the same or similar classification rules for classifying transactions according to a hierarchy. In some embodiments, traffic monitoring data may be integrated with the application runtime data and viewed through an output device. Providing application runtime data associated with traffic monitoring data to an operator is discussed in more detail below, e.g., with respect to FIGS. 12A-13.

Figure 7:
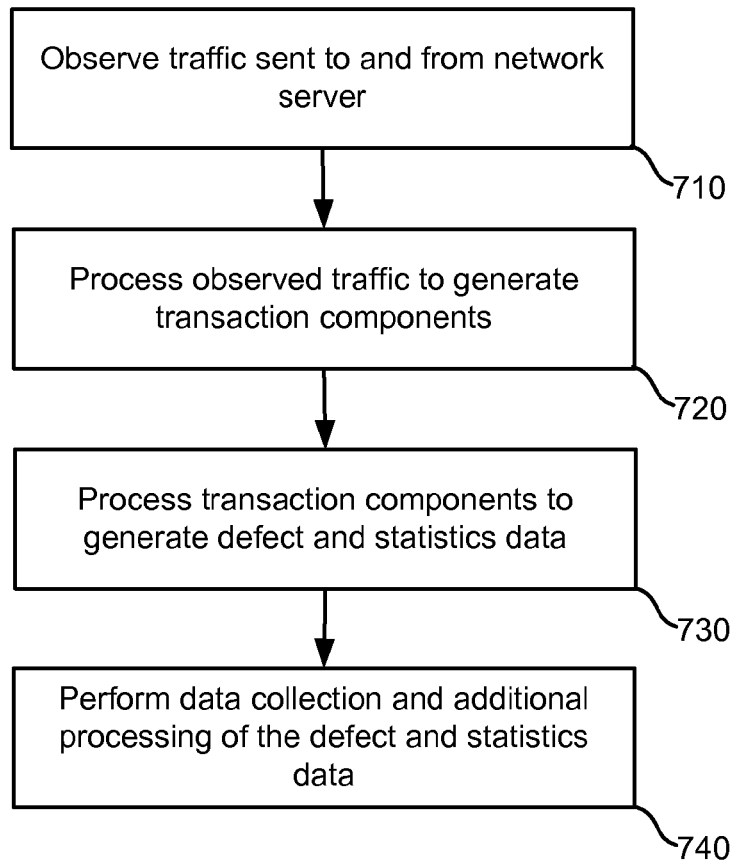
FIG. 7 is a flowchart of an embodiment of a process for observing and processing network server traffic.

FIG. 7 is a flowchart of an embodiment of a process for capturing and processing network service system traffic. In one embodiment, the flowchart provides more detail for step 610 of FIG. 6 performed by traffic monitoring system 180. First, traffic sent to and from network server 140 is observed at step 710, e.g., by receiving the traffic at router 134, switch 136 or some other point between firewall 132 and network server 140. The device which receives the traffic can provide a copy of the traffic to traffic monitoring system 180, enabling system 180 to observe the traffic. In another approach, observing the traffic can include intercepting the traffic and forwarding it to its intended destination.

The traffic monitor 160 processes the observed traffic to generate transaction components at step 720. Referring also to the discussion regarding FIG. 2, this processing may include constructing a data stream from data packets of the observed traffic, determining request-response pairs that form transaction components, and grouping the transaction components into classifications such as transactions, business transactions, business processes and a domain. This processing is discussed in more detail below with respect to FIG. 8.

Traffic monitor 160 processes the transaction components to generate defect and statistics data at step 730. In one embodiment, this involves processing transaction components to identify valid transactions using received transaction definitions, determining defect and statistics data from the valid transactions and defect definitions, and providing the defect and statistics data for further processing, storage and reporting. This processing is discussed in more detail below with respect to FIG. 9.

Transaction server 164 performs data collection and additional processing on the defects and statistics data at step 740. In one embodiment, data collection includes translating the defects and statistics data into a format which can be stored in a database, storing the data and reporting the data. The additional processing may include generating transaction and defect definitions from transaction signature data received from one or more recorders and providing the definitions to traffic monitor 160. Performing data collection and additional processing is discussed in more detail below with respect to FIG. 10A.

Figure 8:
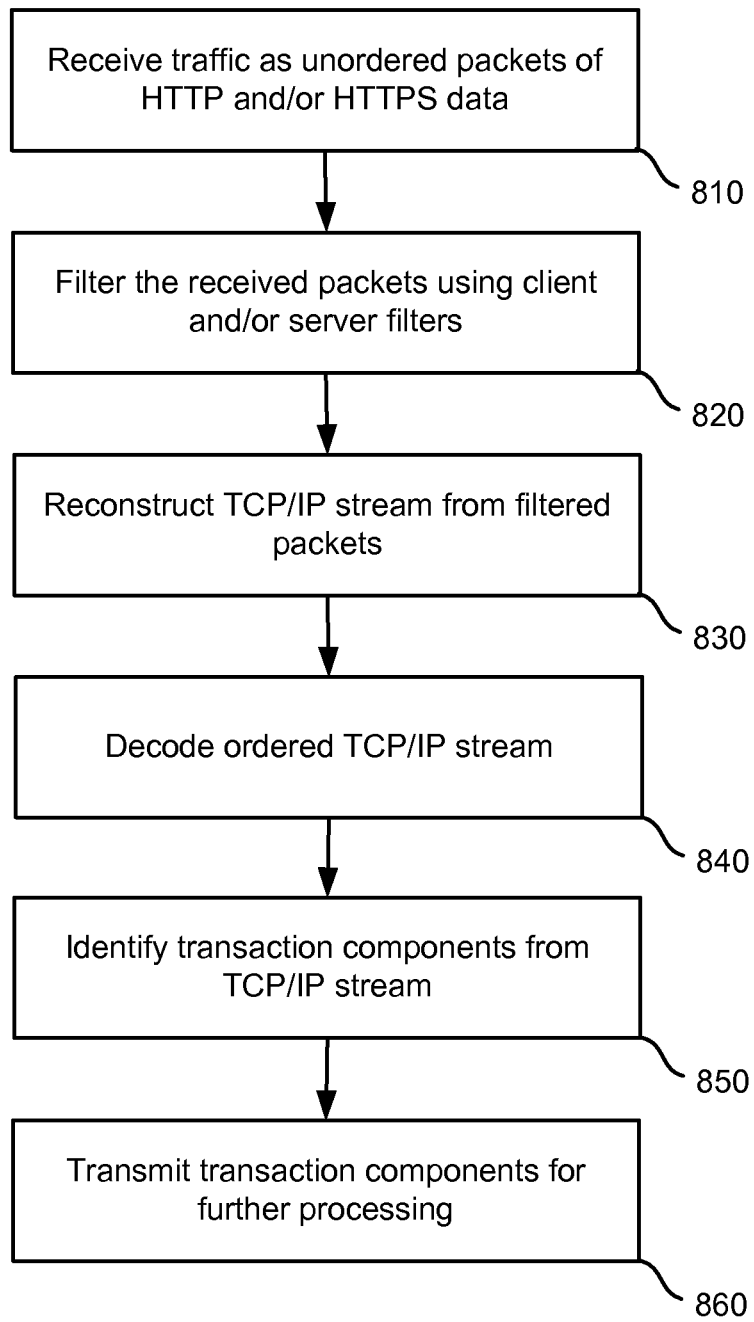
FIG. 8 is a flowchart of an embodiment of a process for obtaining transaction components from observed traffic.

FIG. 8 is a flowchart of an embodiment of a process for obtaining transaction components from observed traffic. In one embodiment, the process provides more detail for step 720 of the process of FIG. 7 and can be implemented by modules 210-250 of transaction server 160 of FIG. 2. At step 810, traffic is received, e.g., in the form of unordered packets of data provided in an HTTP and/or HTTPS format or some other network data transport format.

The unordered packets are filtered at step 820, e.g., via packet processing module 210 using filter data received from the transaction server 164. The filter data can apply to the client 110, network server 140 and/or application server 150. In one embodiment, the filtering achieves load-balancing of large packet streams across multiple traffic monitors. For example, if three traffic monitors process a large packet stream, each traffic monitor may be configured to process one third of the stream. The traffic monitors may be configured by a client or server filter file that instructs each monitor as to what range of traffic to process. The packet filtering can involve determining which traffic should be captured and processed and which packets should be discarded or ignored or otherwise processed differently.

Filtering may be performed based on client and/or server filters received by traffic monitor 160. The client and server filters may include one or more IP address ranges, for instance, which indicate which packets to process and/or which packets not to process for a particular traffic monitor. Thus, if an observed traffic packet has an IP address which is not within a corresponding IP address range of a corresponding filter, the traffic packet is not processed. The client filter file may enable filtering based on client IP address ranges. A server filter file may enable filtering on server IP address ranges. Filtering can also be based on IP-Address:TCP-Port combinations in addition to just IP-Address, or any other form of filtering. If no filter file is received and no client filters are specified for a traffic monitor module, the particular traffic monitor does not perform client filtering of incoming traffic packets. When one or more client filters are specified, any captured packet that does not match at least one of the client filters can be discarded. For example, a packet matches a filter if either its source or destination address is greater than or equal to the <FromIp> address of a client filter and less than or equal to the <ToIp> address of the same filter. In some embodiments, the packet source and/or destination address, client filter <FromIp> address and client filter <ToIp> address are 32-bit numbers.

After filtering the packets, a TCP/IP stream, for instance, is reconstructed from the filtered packets at step 830. The TCP/IP stream can be generated by analysis module 230 of traffic monitor 160 of FIG. 2 such as by generating requests and responses in a network protocol format (e.g., for HTTP format, the requests and responses have a header and data portion) from the received traffic packets. The generated TCP/IP stream is then decoded, if necessary, at step 840 by decoding module 240 of traffic monitor 160 (FIG. 2). In one embodiment, decoding module 240 decodes an encrypted ordered TCP/IP stream using a private key which is obtained from network server 140 or other source by traffic monitor 160 to provide a decoded TCP/IP stream to component ID module 250.

After decoding the stream, transaction components are identified from the TCP/IP stream at step 850 by component ID module 250. As discussed above, a transaction component can include a portion of a content page provided as a response to a request. In this case, component ID module 250 parses requests in the decoded TCP/IP stream to generate transaction components. For example, each request may be parsed to determine query, cookie, post, URL and session type name/value pairs. For example, a typical HTTP post request which can be parsed by traffic monitor 160 is shown below.

```
Request-line: POST /dir/file.html?query1=q1&query2=q2 HTTP/1.1\r\n
request-headers: Content-type: application/x-www-form-urlencoded\r\n
   Host: www.company.com\r\n
   Cookie: cookie1=c1; cookie2=c2\r\n
   Referer: https://www.company.com/dir/home.html?action=login\r\n\r\n
request-body: post1=p1&post2=p2
```

An example of an HTTP parameter list derived from parsing the above request is shown below. Each parameter includes a type and name/value pair.

```
type="Query," name="query1", value="q1"
type="Query," name="query2", value="q2"
type="Cookie," name="cookie1", value="c1"
type="Cookie," name="cookie2", value="c2"
type="Post," name="post1", value="p1"
type="Post," name="post2", value="p2"
type="Url," name="Host", value="www.company.com"
type="Url," name="Path", value="/dir/file.html"
type="Url,"
name="Url",value="www.company.com/dir/file.html?query1=
q1&query2=q2"
type="Url," name="Referer",value="www.company.com/dir/
home.html?action=login"
```

The parameter list data is retrieved from the request listed above. In particular, the parameter list query data can be retrieved from the request-line of the request, the cookie data can be retrieved from the request headers, the post data can be retrieved from the request body, and the URL data can be retrieved from the request header and request line.

Identifying components at step 850 may include identifying primary and secondary components. As discussed above, a request can be processed to identify transaction components by comparing parameters in the request to parameters in a transaction definition. If the request includes a primary transaction component, the request can be categorized directly according to the transaction with which the primary transaction component is associated. A primary transaction component and associated secondary components can be identified by their use of the same session ID in one possible approach. In some embodiments, a primary component may be identified as the first component to have a particular session ID. In some embodiments, a primary component is a component having a "content type" value that starts with "text." If no primary transaction component is used, the request can be categorized according to a transaction definition which is met by a set of one or more transaction components of the request. Further, the request-response pair can be categorized according to the request, in one possible approach. The transaction components are transmitted by component ID module 250 to user ID module 260 and component processing module 270 of traffic monitor 160 for further processing at step 860.

Figure 9:
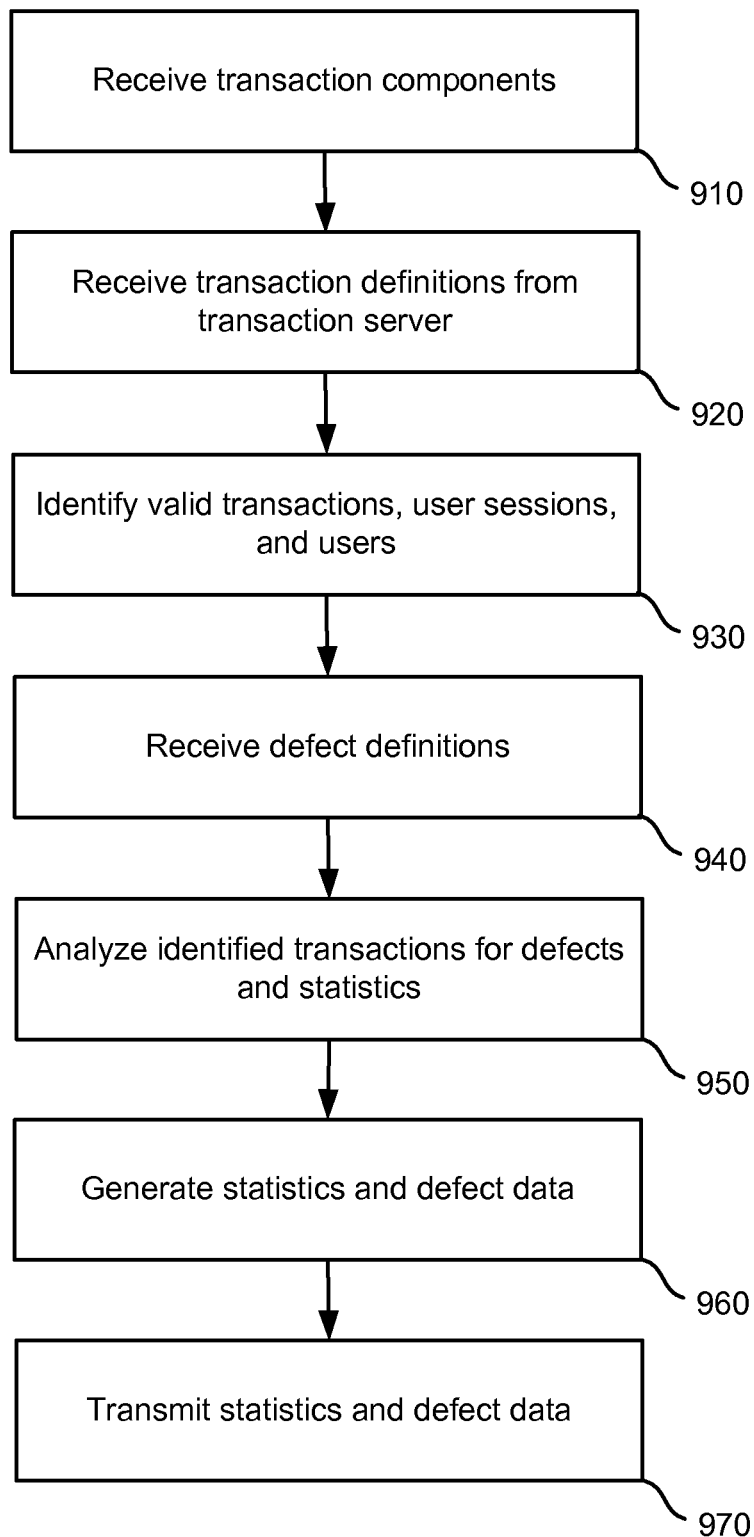
FIG. 9 is a flowchart of an embodiment of a process for processing transaction components from observed traffic.

FIG. 9 is a flowchart of an embodiment of a process for processing transaction components. In one embodiment, the flowchart of FIG. 9 provides more detail for step 730 of FIG. 7 and is implemented by modules 260-280 of traffic monitor 160 of FIG. 2. First, transaction components are received at step 910, e.g., including primary components and secondary components.

Transaction definitions are received by module 270 from transaction server 164 at step 920. The transaction definitions are generated by transaction server 164 from user input and/or transaction signatures received by transaction server 164 to describe templates that the traffic monitoring system should use in detecting patterns in the traffic. In one embodiment, recorders capture transaction data, generate transaction signatures from the transaction data and provide the signatures to transaction server 164. An operator may view the transaction signatures, modify them if desired, and select them to become transaction definitions. The transaction definitions may include HTTP parameter definitions, for instance, such as type, name and specification parameters. The type contained in the HTTP parameter definitions may include a query, cookie post, URL or session manager type. An HTTP parameter definition of a transaction name may be "user login" or any other name provided by an operator. The specification parameters may indicate a URL associated with the transaction, user identification, client machine identification, server machine identification, and other parameters associated with the particular transaction. Generation of transaction definitions from transaction signatures is discussed in more detail below with respect to steps 1050-1060 of FIG. 10B.

After receiving transaction definitions, traffic monitor 160 identifies valid transactions, user sessions and users at step 930. In one embodiment, a user name associated with a user session is detected by user ID module 260. The user name may include a login name for a user and can be included in the first request-response pair associated with a session. Once the login name or user name is identified, the login name and corresponding session ID (included in every request and response pair) is forwarded as login data to transaction server 164. User ID module 260 then forwards the session identification data to statistics and defects monitor 280.

Component processing module 270 identifies valid transactions by comparing the transaction definitions to the transaction components. In some embodiments, component processing module 270 may compare a URL of a transaction component with the transaction definitions. In some embodiments, component processing module 270 may also compare user identification, client machine identification, and other information of the transaction components to the transaction definitions. If the data contained in the transactions components does not match any transaction definition, the transaction component can be discarded, ignored, identified as "unclassified" or otherwise processed.

Defect definitions are received from transaction server 164 by traffic monitor 160 at step 940. At step 950, identified transactions are monitored for defects and statistics. Step 950 may be performed by statistics and defects monitor 280 of the system of FIG. 2. For example, valid transactions can be compared to the defect definitions to determine if any of the transactions are defective. Defect definitions may specify what comprises a defect and/or an acceptable transaction. In any case, transactions identified as defective are identified at step 950. For example, the defect definitions may specify that a transaction having a particular URL should not have a response time over a particular response time threshold. Thus, for all transactions having the particular URL and having a response time over the response time threshold, the transaction is identified as defective. A defective transaction is a transaction with one or more defects.

Statistics and defect data are then generated from the identified transactions at step 960 by statistics and defects monitor 280. Statistics may include, e.g., response time, count of completed transactions, count of uncompleted transactions, and other statistics for one or more transactions. Defect data may include defect and incident information, count information such as the number of times a particular defect has occurred and other data associated with transactions identified as being defective. The statistics and defect data is transmitted to transaction server 164 at step 970. In some embodiments, the defect data may be in XML format and the statistics data may be in binary format.

Figure 10A:
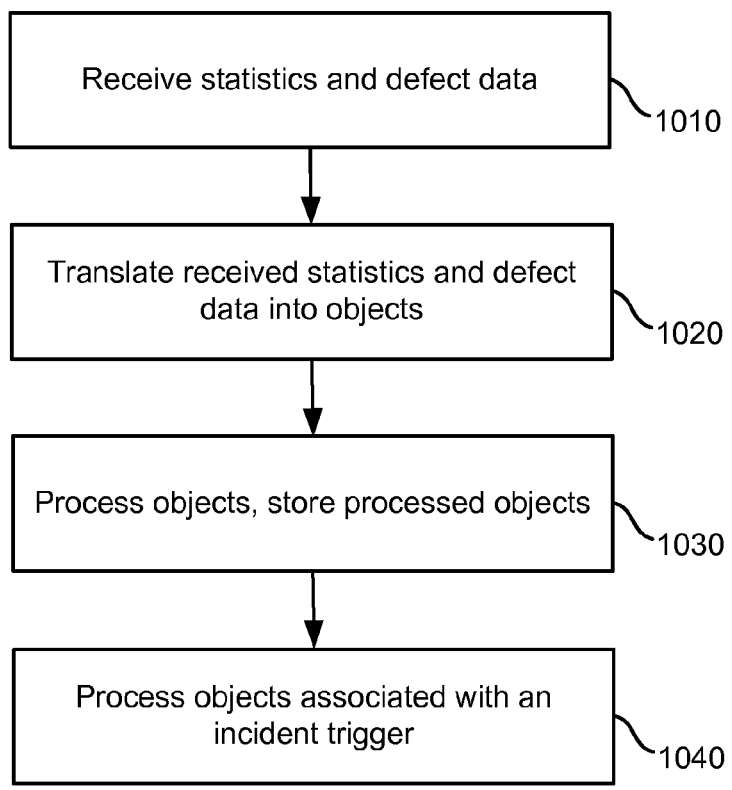
FIG. 10A is a flowchart of an embodiment of a process for performing data collection.

FIG. 10A illustrates a flowchart of an embodiment of a process for performing data collection. In one embodiment, the flowchart provides more detail for step 740 of the flowchart of FIG. 7 and is performed by transaction server 164. At step 1010, statistics and defect data are received by transaction server 164 from traffic monitor 160. In one embodiment, the statistics data is provided for one or more transactions based on the transaction URL. In some embodiments, the defects and statistics may be received by event collector 130 and statistics collector 350, respectively (FIG. 3).

The statistics and defect data are translated into a persistent storage state and stored, e.g., in an SQL database. In this embodiment, the statistics and defect data are first translated into objects such as Java objects at step 1020. The translation may be performed by collectors 310 and 350, as illustrated in FIG. 3. Statistics collector 350 receives statistics data, e.g., in a binary format, from traffic monitor 160, translates the received data into objects and provides the objects to statistics processor 355.

The objects are processed and stored at step 1030 by event processor 320. In one embodiment, storing the objects includes retrieving login data from the objects and storing the login data as a session ID and user name pair.

Next, the objects associated with a defect trigger are processed at step 1040. In some embodiments, the objects are processed to determine whether a defect is new or matches pre-existing defect criteria. In this embodiment, if a defect does not match pre-existing defect criteria, a new defect is created. Handling of triggers and the corresponding gathering of evidence is discussed in more detail above.

Figure 10B:
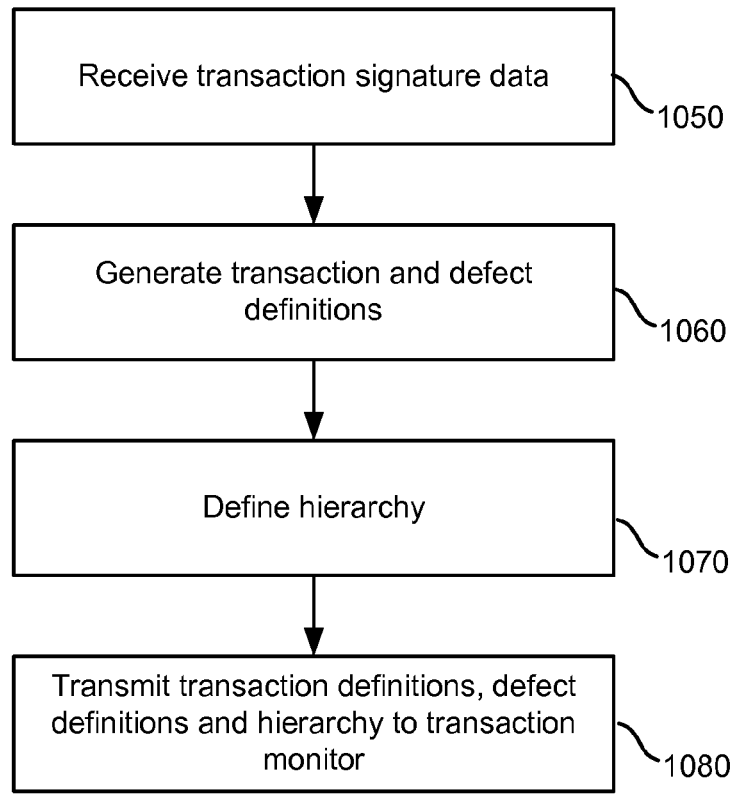
FIG. 10B illustrates a flowchart of an embodiment of a process for generating and transmitting transaction and defect definitions.

FIG. 10B illustrates a flowchart of an embodiment of a process for generating and transmitting transaction and defect definitions. In one embodiment, the flowchart provides more detail for step 740 of the flowchart of FIG. 7. As discussed above, a transaction signature describes an individual transaction that is captured by a recorder. A received transaction signature may later be manipulated into a transaction definition through transaction server 164 and used by traffic monitor 160 to identify valid transactions. Transaction signature data may be received by event collector 310 from one or more recorders, such as recorders 114, 162 and 174 of FIG. 1D and translated into objects before being stored in database server 360 (FIG. 3).

After receiving the transaction signature data, transaction definitions and defect definitions can be generated at step 1060. In one embodiment, admin console 380 provides an interface through browser 382 (FIG. 3) for this purpose. In particular, the operator may manipulate the transaction signature data and enter other commands through the interface to generate the transaction and defect definitions. This provides a convenient method for generating transaction definitions without having to generate them from scratch, although it is also possible for the operator to provide one or more transaction definitions from scratch. Rather, transactions can be recorded from actual client-application interactions, data for the transactions can be provided to an operator as a transaction signature for a particular transaction, and the operator may modify, e.g., edit, the signature through the interface.

For example, admin console 380 may present transaction signature data for a login transaction signature which includes parameters indicating that a login transaction request was received from a particular client machine A by a particular front-end web server B, that the request from client machine A included a specific user name parameter and password parameter, and that the request took twenty milliseconds to complete. An operator may manipulate the transaction signature into a transaction definition by changing the parameters, e.g., to identify a transaction from any client machine (rather than only client machine A). This can be done by deleting an identifier in the transaction signature associated with client machine A, for instance. A wildcard character can also be used to specify, e.g., a subset of a group of machines which are to be included in a transaction definition. The transaction signature can similarly be modified to omit a reference to any specific user name and password parameters and to specify a response time no greater than fifty milliseconds, for instance, (rather than exactly twenty milliseconds). In this case, the transaction definition is made more general and inclusive than the original transaction signature. A balance should be struck in modifying transaction definitions to avoid over- or under-inclusiveness. The operator can thus modify a transaction signature and select or "promote" the transaction signature to a transaction definition for transactions of interest.

For example, assume the operator is interested in monitoring a login process which involves one or more web pages which allow a user to login to a web site. The trained operator can recognize such web pages by their URLs. Requests with URLs for those web pages may therefore be generalized and promoted to transaction definitions. Moreover, a request with a URL for a login web page will typically include an identifier of the particular user in a query field of the URL, e.g., after the "?" in the URL. This user-specific information would result in an unnecessarily narrow transaction definition because only login requests from that specific user would match. Accordingly, the URL can be edited to delete the user-specific information, thereby generalizing the transaction definition so that login requests from all users will match the transaction definition.

In some embodiments, a signature parameter of a response time threshold may be used to identify defective transactions. For example, a transaction signature may be modified and saved as a defect definition so that transaction signatures which match the defect definition indicate a defective transaction. In another approach, a transaction signature may be modified and saved to define a non-defective transaction so that transaction signatures which match the non-defect definition indicated a non-defective transaction. In any case, the modified transaction signature may then be saved as a transaction definition. Additionally, generating a transaction or defect definition may include defining a business transaction, a domain, an application and user identifiers, business processes associated with an application, and other information. An application may be an attribute of a business process and include a session ID, user ID and other information.

Thus, admin console 380 may access the stored transaction signature data, provide it through an interface to be edited by an operator, and store the resulting transaction and/or defect definitions at database server 360. In other embodiments, an operator may manually generate transaction and defect definitions and store them in database server 360.

At step 1070, the operator can define a hierarchy. For example, a domain level can be defined at the top of the hierarchy followed by one or more business processes and business transactions associated with the business processes, where the detected transactions in the traffic can be associated with the business transactions. See also the discussions associated with step 102 of FIG. 1B and the component processing module 270 of FIG. 2. A hierarchy rules engine can be generated based on the transaction and hierarchy definitions for use in classifying interactions with an application.

After generating transaction definitions, defect definitions and a hierarchy, they are transmitted to traffic monitor 160 at step 1080 for use in monitoring incoming traffic, identifying transactions to process and classifying the transactions according to the hierarchy.

Figure 11:
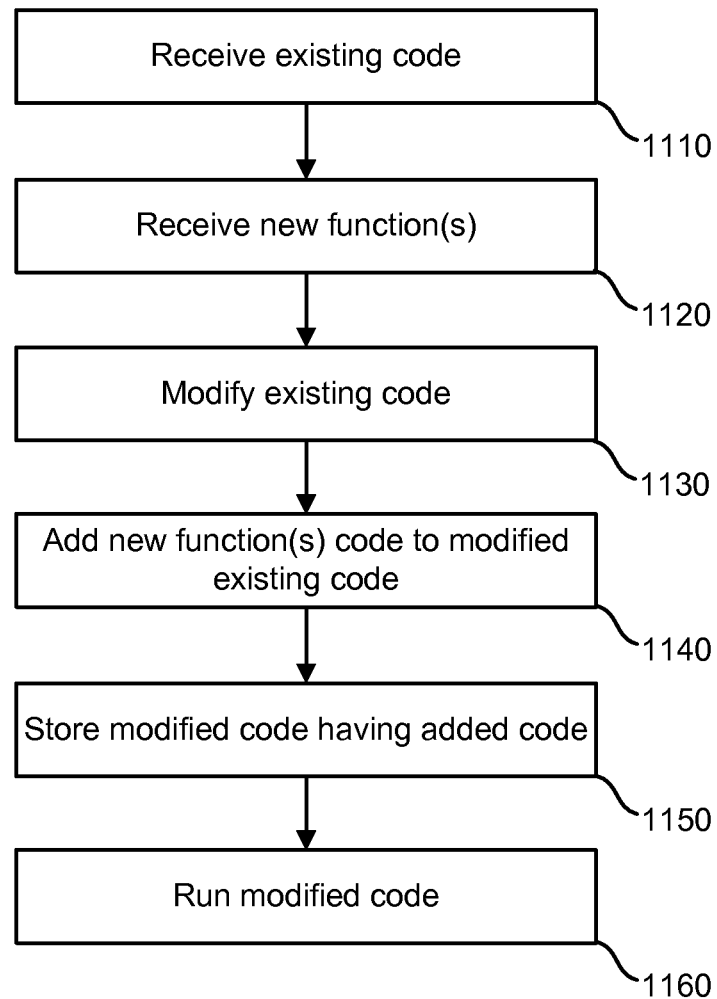
FIG. 11 is a flowchart of an embodiment of a process for modifying application code to generate application runtime data.

FIG. 11 is a flowchart of an embodiment of a process for modifying application code to generate application runtime data. As discussed in connection with FIG. 4, application monitoring system 190 monitors one or more applications, such as application 151 of application server 150, and generates application runtime data from the monitored applications. To achieve this, application code is configured to generate and provide application runtime data which is associated with processing of requests. Put another way, the flowchart of FIG. 11 is one embodiment of a process of modifying the existing object code of an application in order to monitor the application. In step 1110, a probe builder or other module receives the existing object code. In step 1120, the probe builder receives the new functionality, which can be new classes and processes that allow for monitoring of the application. In some embodiments, the new classes and processes can be provided by one or more libraries.

The existing code is modified to prepare for additional code at step 1130. In some embodiments, the existing code is modified to account for the size of the additional code, e.g., by adjusting indices for the existing code. Instructions of the existing code which follow an insertion point of the additional code are moved to make room for instructions of the additional code. For example, if the new code consumes eight bytes, then the indices for the existing code are adjusted to reflect a displacement of eight bytes. Additionally, all references to bytecode within an instruction, e.g., a pointer reference for a jump or branch instruction, may be adjusted.

All or part of the new functionality (e.g., the new classes/methods) is added to, combined with, or otherwise associated with the existing modified code at step 1140. Note that instrumenting bytecode of an application is only one example of a technique for monitoring an application. Various other techniques can be used, such as plugging into an exit built into the application or network server. In one embodiment, step 1140 may include adding a function which writes application data, such as a request-response pair identifier, an application server IP address and other information, to a response header generated by application code, as discussed in more detail below with respect to step 1220 of the flowchart of FIG. 12A. The application data may be observed and processed as network server traffic by traffic monitor 160 as the response travels from application server 150 to network server 140 and to client device 110. The modified code which includes the added code is stored at step 1150. In step 1160, the modified code is run, thereby generating application runtime data.

Figure 12A:
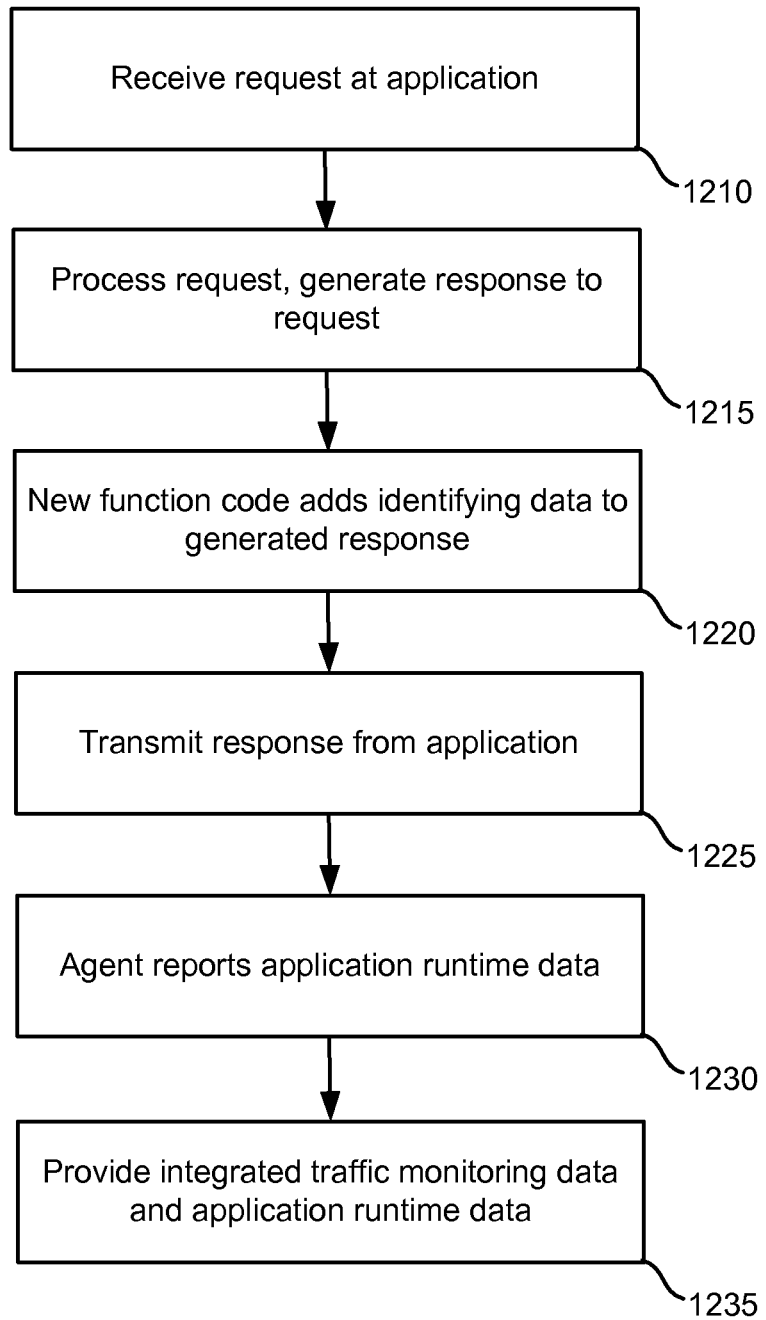
FIG. 12A is a flowchart of an embodiment of a process for processing an application request to associate traffic monitoring data with corresponding application runtime data.

FIG. 12A is a flowchart of an embodiment of a process for processing an application request to associate traffic monitoring data with corresponding application runtime data. One feature of the present technology involves integrating traffic monitoring data and application runtime data. In some embodiments, the integrated traffic monitoring data and application runtime data may be accessed through traffic monitoring system 180. In this approach, identifying data can be communicated to traffic monitoring system 180 from application monitoring system 190 or from another location to enable traffic monitoring system 180 to access application runtime data corresponding to traffic monitoring data for a particular request-response pair. For example, the identifying data may include index data, a request-response pair identifier and/or other information regarding the application runtime data. The identifying data may be communicated to system 180 by inserting the data into a response generated by an application, in one possible approach. In one embodiment, application monitoring system 190 may insert the identifying data into the response. The response and the identifying data may then be observed and processed by traffic monitoring system 180.

In one embodiment, FIG. 12A provides more detail of step 630 of FIG. 6. A request is received at an application at step 1210. The application processes the request and generates a response at step 1215 thereby forming a request-response pair. Processing the request may include performing actions by application code within application server 150 as well as accessing database server 151 or some other back-end server, e.g., by calling a servlet or EJB of the application.

Identifying data for the request-response pair is inserted into the generated response by new function code at step 1220. In some embodiments, the identifying data may be inserted into the response sometime before the response has been completely generated rather than after the response is completed. Other application-related information can also be provided in the response, including an application server ID, such as an IP address of the machine that the agent is running on, a virtual machine ID, which is a name associated with agent 152, a request handler ID, which is an entry point and/or a servlet name (servlet class name) which is involved in generating the response, and a servlet response time.

At step 1225, after adding the identifying data and other application-related information to the response, the response is transmitted from the application to network server 140, which may or may not perform additional processing of the response. After any further processing is performed, the response is sent by network server 140 to client 110. Traffic monitoring system 180 may observe and process the response such as by determining transaction components associated with the response, determining if the response is part of a defective transaction, and incorporating the response into defect and transaction statistics as discussed above with reference to FIG. 7. Moreover, the identifying data may be retrieved from the response and used to retrieve application runtime data associated with the response. The application-related information can also be retrieved. For example, if it is determined that the response is part of a defective transaction, corresponding application runtime data may be identified from the identifying data. This is discussed in more detail below with respect to FIG. 12B.

Application runtime data is reported by agent 152 of application server 150 to Enterprise Manager 155 at step 1230. The application runtime data may be indexed to the identifying data added to the response as well as other application data regarding processing of a request by application 151. Integrated traffic monitoring data and corresponding application runtime data can be provided to the operator via an interface, for instance, at step 1235 as discussed in more detail below with respect to FIG. 12B. Essentially, the traffic monitoring data and application performance data can be cross-referenced to one another to allow the operator to easily access both types of data to provide an enhanced understanding of network and application activity.

Figure 12B:
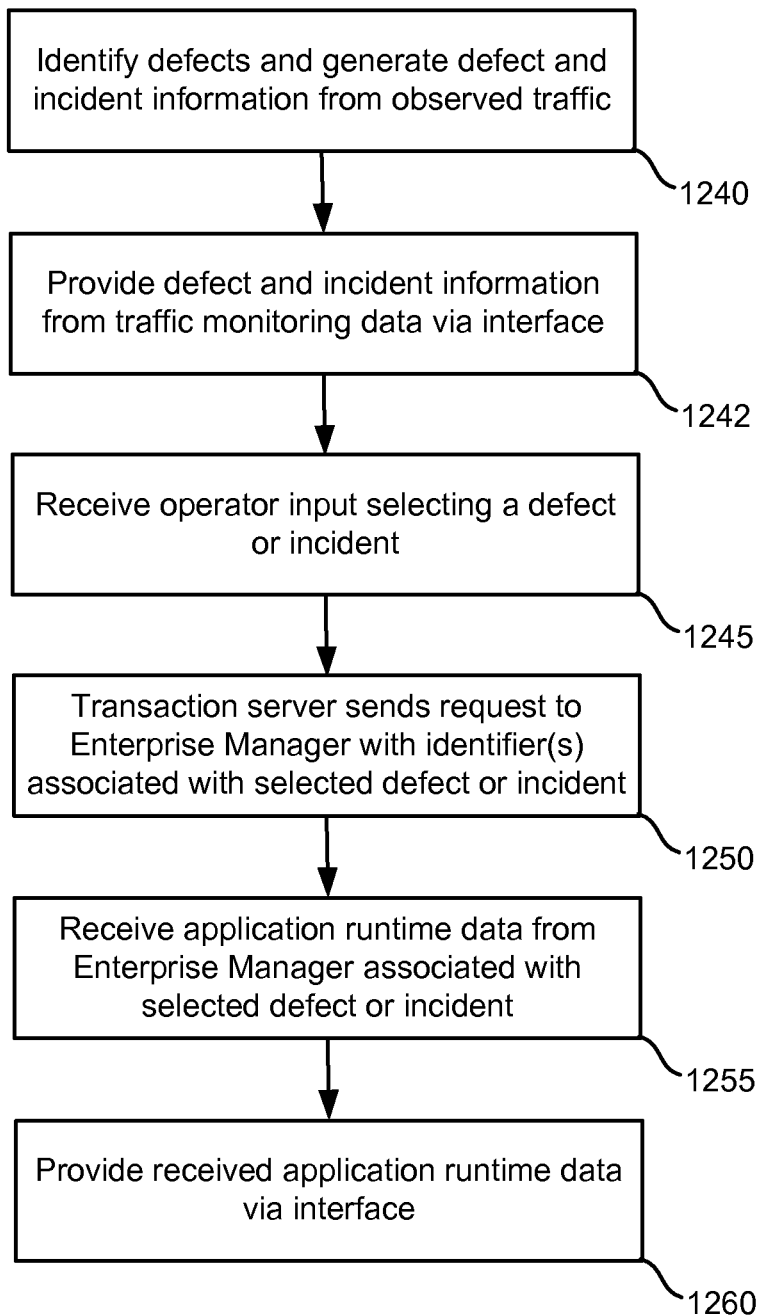
FIG. 12B is a flowchart of an embodiment of a process for associating application runtime data with corresponding traffic monitoring data.
Figure 12C:
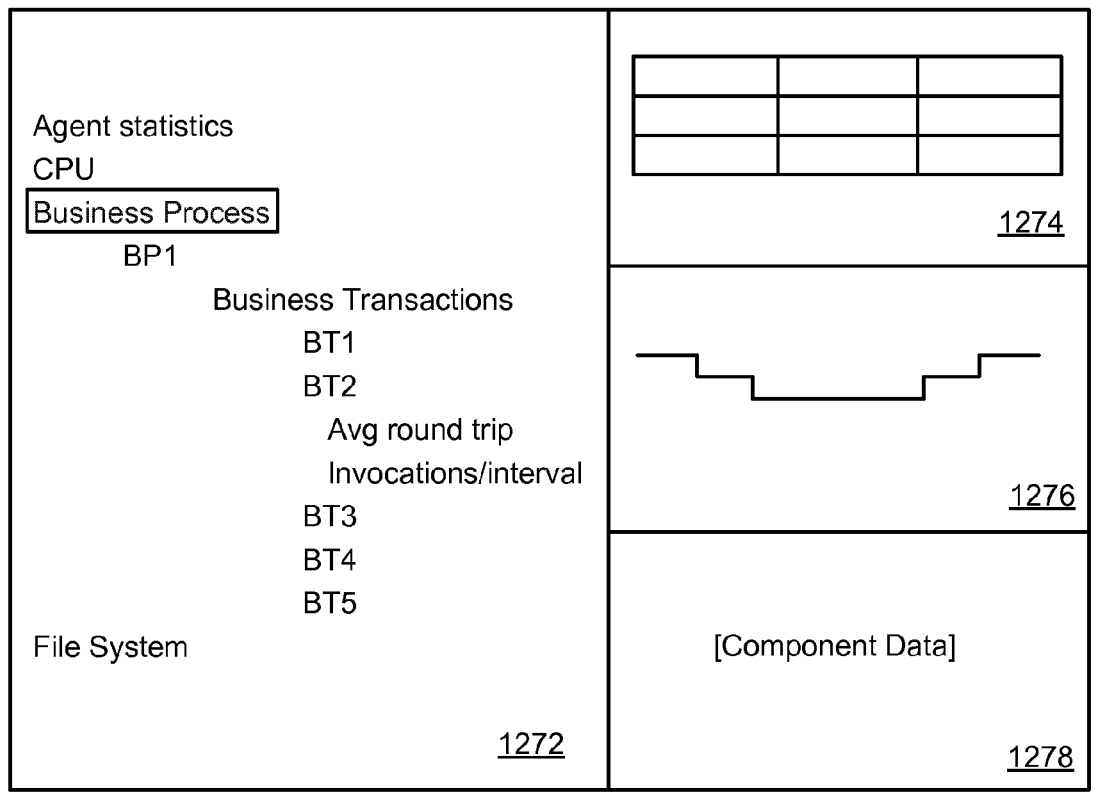
FIG. 12C is an example interface for displaying traffic monitoring data and application runtime data.

FIG. 12B is a flowchart depicting an embodiment of a process for associating application runtime data with corresponding traffic monitoring data. In one embodiment, the flowchart of FIG. 12B provides more detail for step 1235 of the process at FIG. 12A. Defects and incidents are identified and associated information is generated from the traffic monitoring data at step 1240. In one embodiment, this step is performed by traffic monitor 160 and transaction server 164. Step 1240 may include performing steps 710-730 of the process of FIG. 7 as discussed above. Identification of defects is discussed above with respect to step 950 of the flowchart at FIG. 9.

Next, data associated with the generated defects or incidents may be provided to an operator at step 1242, e.g., through an interface provided within browser 382 (FIG. 3). The interface content is provided to browser 382 by admin console 380. The operator can provide an input through the interface selecting a particular defect or incident for which application runtime data is desired, at step 1245. In response, transaction server 164 sends a request to Enterprise Manager 155 with identifying data associated with the selected defect or incident at step 1250. As mentioned, such identifying data may have been previously retrieved by traffic monitoring system 180 from a response provided to client 110, in one approach. For example, the identifying data may be associated with a request-response pair associated with a defect or one or more request-response pairs associated with one or more defects which triggered an incident. In another embodiment, transaction server 164 may send business transaction or transaction ID information to Enterprise Manager 155. In this case, Enterprise Manager 155 may have a mapping of business transaction or transaction ID to application runtime data. Enterprise Manager may then use the mapping to identify application runtime data associated with the selected defect or incident. In any case, when a request for application runtime data is received by Enterprise Manager 155 from transaction server 164, Enterprise Manager 155 gathers the requested data and sends it to transaction server 164.

Transaction server 164 receives the requested application runtime data associated with the selected defect or incident at step 1255. In one embodiment, the application runtime data is provided in an interface based on a hierarchy represented by a tree having a number of nodes. A portion of the application runtime data which is associated with a selected level of the hierarchy can be displayed based on a selected node. In some embodiments, the application runtime data may be received in some other format. Once the requested application runtime data is received, it is provided to the operator through the interface or some other means at step 1260.

In some embodiments, traffic monitoring data, such as statistics, defect and incident data derived from observed traffic, along with application runtime data, may be accessed through application monitoring system 190. In some embodiments, the application runtime data and/or corresponding traffic monitoring data can be displayed based on a hierarchy represented by a tree. A representative example of an interface for providing such a display, illustrated in FIG. 12C, includes display regions 1272, 1274, 1276 and 1278. Display region 1272 represents the hierarchy as a tree with selectable nodes. "RT" denotes response time. The tree has the following form, in one possible approach:

```
Domain
    Business Processes
        Business_Process1
            Business Transactions
                Business_Transaction1
                    Average Response time (ms)
                    Errors Per Interval
                    Invocations Per Interval
                Business_Transaction2
                    Average Response time (ms)
                    Errors Per Interval
                    Invocations Per Interval
        Business_Process2
```

Thus, the tree can organize the presentation of application runtime data and/or traffic monitoring data based on a hierarchy which includes a domain, business processes, business transactions and other nodes. Display region 1274 illustrates a representative table without data. The table in an actual interface may have information regarding defects of an incident which has been classified to the selected level of the hierarchy, for instance. An operator can select any of the rows of the table to have the corresponding trace displayed in the display region 1276, which includes a simplified representation of trace. Display region 1278 may provide other details regarding the invoked application components, such as an identifier of the request-response pair associated with the selected trace and other component data.

Figure 13:
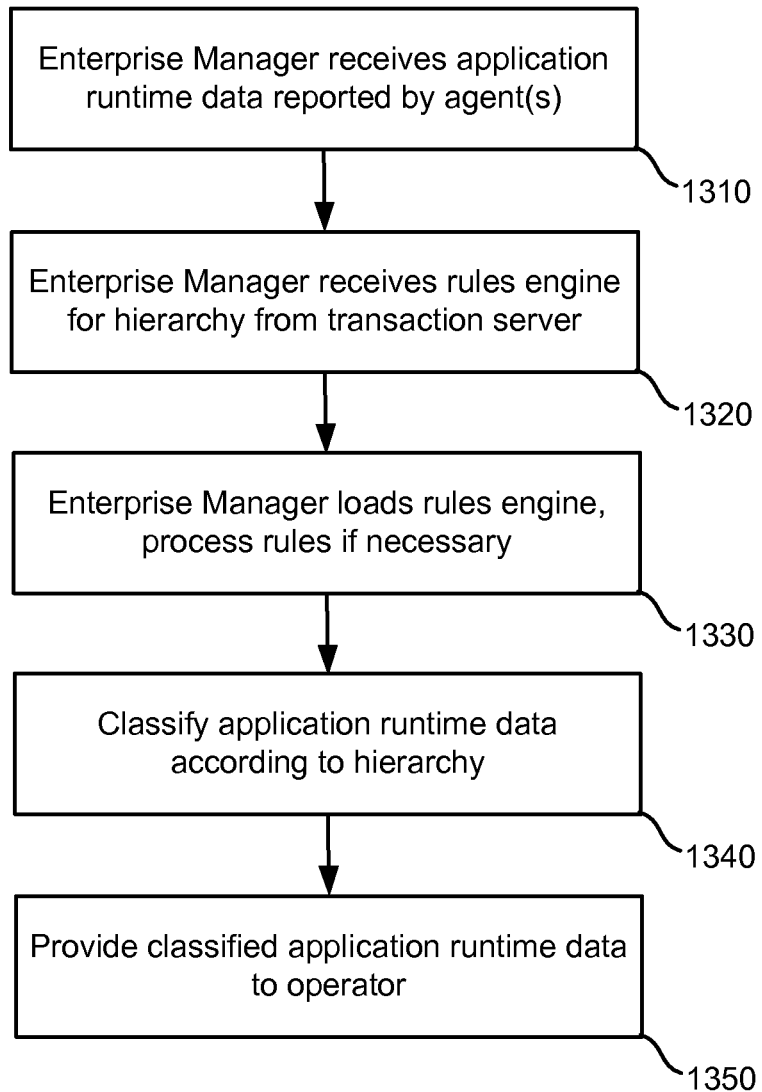
FIG. 13 is a flowchart of an embodiment of a process for providing traffic monitoring data and corresponding application runtime data to an operator via an interface.

FIG. 13 is a flowchart of an embodiment of a process for providing integrated traffic monitoring data and corresponding application runtime data to an operator through application monitoring system 190. In some embodiments, the process of FIG. 13 provides more detail for step 630 of the process of FIG. 6. Application runtime data reported by agent 152 is received by Enterprise Manager 155 at step 1310. The application runtime data can be associated with request-response pairs and can be reported as discussed above with respect to step 1230 of FIG. 12A.

Next, a rules engine for a hierarchy is received by Enterprise Manager 155, e.g., from transaction server 164, at step 1320. The set of rules can be generated by traffic monitoring system 180 in response to observed traffic and operator inputs. In some embodiments, the rules engine can be shared with the application monitoring system once, periodically, or at some other rate with respect to integration of data between traffic monitoring system 180 and application monitoring system 190.

In one embodiment, the rules engine may be generated from an XML file and can provide information for associating transactions with one or more levels of a hierarchy. In particular, the rules engine may provide classification rules and/or descriptions for identifying a domain, business processes within the domain, business transactions within the business processes, transactions within the business transactions and transaction components within the transactions. For example, the rules engine may describe HTTP request characteristics associated with a particular transaction, such as a URL host name, URL parameters, HTTP post parameters, cookie parameters and session manager parameters for each transaction.

The rules engine is loaded by Enterprise Manager 155 at step 1330. The rules can be modified, if necessary, to generate a modified rules engine which is tailored to the needs of the application monitoring system. For example, Enterprise Manager 155 may generate a modified set of rules to identify transaction components, e.g., by parsing the set of rules of the received rules engine. To this end, a configuration file which is used to generate the rules engine may include header information identifying each transaction component definition and body information containing the details of the transaction component definitions, such as name/value pairs that are associated with a transaction component. When the header information is detected during parsing, the information in the body is read and stored. A rule is then derived from the transaction component definition body portion.

Modified rules for identifying a transaction, business transaction, business process, domain and optionally other information can similarly be generated to provide the modified rules engine. The rules to identify the different levels of the hierarchy are derived from the portions of the rules engine which describe the corresponding elements. In one embodiment, the hierarchy can be represented by a tree having nodes which define the different levels of the hierarchy. In some embodiments, the rules engine used by the application monitoring system can be shared with traffic monitoring system 180.

Application runtime data may be classified according to the hierarchy at step 1340. For example, a transaction component may be associated with a request received and processed by application server 150. See the discussion above regarding step 102 (FIG. 1B) regarding binding of transaction components to the hierarchy. Step 102 can be applied equally by the traffic monitoring system using its rules engine or by the application monitoring system using its rules engine. Or, the traffic monitoring system and the application monitoring system can use the same rules engine.

In particular, application runtime data generated for each request received and processed by an application may be associated with a transaction component. The request received by the application includes parameter data associated with a transaction component. The parameter data may include, e.g., URL host name, URL parameters, HTTP post parameters, cookie and/or session manager parameters for each transaction. The agent, for instance, can compare the parameter data against the set of rules identifying a transaction component. If the parameter data matches a transaction component rule, the request is associated with the particular component. Optionally, the comparison can be made by the Enterprise Manager 155 or other entity.

For example, consider a business process for purchasing a book through a web site. This business process may include business transactions of performing a login, shopping to select a book, adding a selected book to a cart, and proceeding to checkout where payment information is entered. The business transaction of proceeding to checkout may include a request for a checkout content page and a response which provides the checkout page; the request for the checkout page may be processed by a checkout servlet within the monitored application. The rules engine received at step 1320 can identify the "checkout" transaction by URL host name (web server name), URL parameters (the URL itself), HTTP post parameters (parameters passed in the request), cookie parameters (cookies maintained, created or deleted as a result of the request) and/or session manager parameters (name/value pairs obtained from a session manager). Application runtime data reported at step 1310, which indicates the checkout servlet has processed a request, may include servlet identification information as well as URL host name, URL parameters, HTTP post parameters, cookie parameters and/or session manager parameters associated with the request processed by the servlet. These parameters will match the parameters for the checkout transaction, and the servlet will be associated with the transaction component at step 1340.

Moreover, because the transaction component is part of a transaction, a transaction is part of a business transaction, a business transaction is part of a business process and a business process is part of a domain, in the example hierarchy, the servlet can be associated with those additional levels of the hierarchy as well at step 1340.

A received request can be marked or otherwise associated with a transaction and business transaction. The reported application runtime data classified according to the hierarchy is then provided to an operator by Enterprise Manager 155 at step 1350. In one embodiment, the application runtime data may include average response time, errors per interval, method invocations per interval and other information for a transaction. This information can be provided along with the hierarchy information corresponding to the transaction and may be reported to an operator, e.g., through an interface provided by workstations 410 or 420 or other machines (not pictured).

Automatically Correlating Data

In some embodiments, a network service monitoring system can automatically correlate SLAs and OLAs by processing traffic monitoring data and corresponding application runtime data. The correlation can be made using a hierarchy used to organize both types of data. By organizing the data in similar hierarchies, for example, using a set of definitions (such as Transaction definitions) to organize the data into a transaction based hierarchy, an SLA associated with a particular business transaction can be associated with OLAs associated with the same business transaction.

Figure 14:
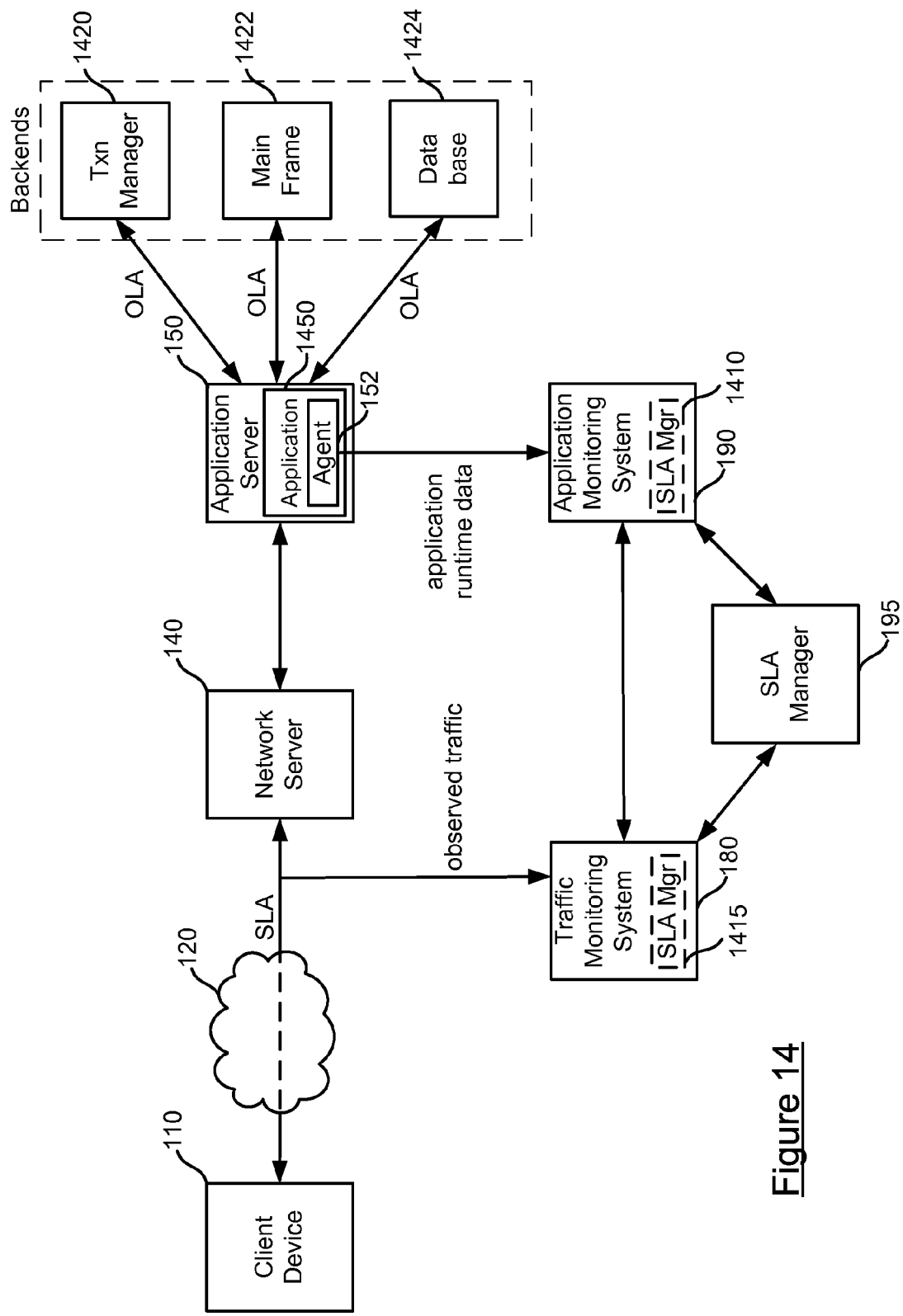
FIG. 14 is an embodiment of a block diagram of a system for correlating SLA and OLA related application runtime data.

In some embodiments, application runtime data received by Enterprise Manager 155 may be generated by agent 152 in response to tracing application transactions. This tracing may correlate inbound requests for an application to outbound application requests. In some embodiments, the transaction tracing may associate a URL request (or other network server request) received by the application with corresponding calls made by the application to one or more backends to process the URL request FIG. 14 is an embodiment of a block diagram of a system for correlating traffic monitoring data associated with an SLA and application runtime data associated with an OLA. The system of FIG. 14 is similar to the system of FIG. 1 except for application 1450 within application server 150, a number of backend systems 1420-1424, and SLA managers 195, 1410 and 1415. Client device 110, network server 140, application server 150, traffic monitoring system 180 and application monitoring system 190 are similar to those illustrated and described above with respect to the system of FIG. 1. One or more SLAs may be associated with transactions, transaction components or some set of request and response pairs between client device 110 and network server 140. One or more OLAs may be associated with a transaction between application 1450 and one or more of backends 1420-1424.

An SLA manager may be located within traffic monitoring system 180 as SLA manager 1415, within application monitoring system 180 as SLA manager 1410, or outside both systems but in communication with these systems as SLA manager 195. Any of SLA managers 195, 1410 and 1415 can receive application runtime data from application monitoring system 190 and traffic monitoring data from traffic monitoring system 180. Upon receiving the data, the SLA manager may determine whether or not an SLA violation and/or an OLA violation has occurred, correlate the SLA related and OLA related data, and provide reports regarding the correlated SLA related traffic monitoring data and OLA related application runtime data. Operation of SLA manager 195 is described in more detail below with respect to the process of FIG. 21.

Several backends may be in communication with and process requests from application 1450 of application server 150. Backends 1420-1424 illustrated in the system of FIG. 14 include transaction manager 1420, mainframe 1422 and database 1424. Other backends may be accessed by application 1450 as well. Transaction manager 1420 may be implemented as "Customer Information Control System" servers and software, provided by International Business Machines, Incorporated, of Armonk, N.Y., "Tuxedo" servers and software, of BEA, Incorporated, of San Jose, Calif., or some other transaction management system. Mainframe 1422 may be used to handle operations, calculations, or other requests on behalf of application 1450. Database 1424 may be implemented as one or more storage servers, such as a SQL server, or some other storage system or device. In some embodiments, each backend may communicate with more than one application server (not illustrated in the system of FIG. 14).

An SLA may apply to traffic between client device 110 and network server 140. In particular, an SLA may have parameters that specify a level of service that network server 140 must provide a user at client device 110. The level of service may be specified as thresholds to be satisfied in providing the service over a period of time for one or more identified transactions, business transactions, domains, or some other collection of traffic (request response pairs) between network server 140 and client device 110. For example, the SLA may require ninety percent of the responses provided by network server 140 to a particular URL be returned in less than 500 milliseconds and that one hundred percent of the responses be returned in less than 1000 milliseconds. Another Example of an SLA with respect to availability may be to service 99.999% of inbound requests.

Similarly, an OLA may apply to internal transactions between application 1450 and any of backends 1420-1424. These internal transactions are performed when application 1450 processes network server traffic on behalf of network server 140 and are indicated by "OLA" in the system of FIG. 14. Parameters associated with an OLA may specify a level of operation that the corresponding backend must provide application 1450. The level of service may be specified as thresholds to be satisfied in providing the service over a period of time for one or more identified transactions between application 1450 and the particular backend.

Figure 15:
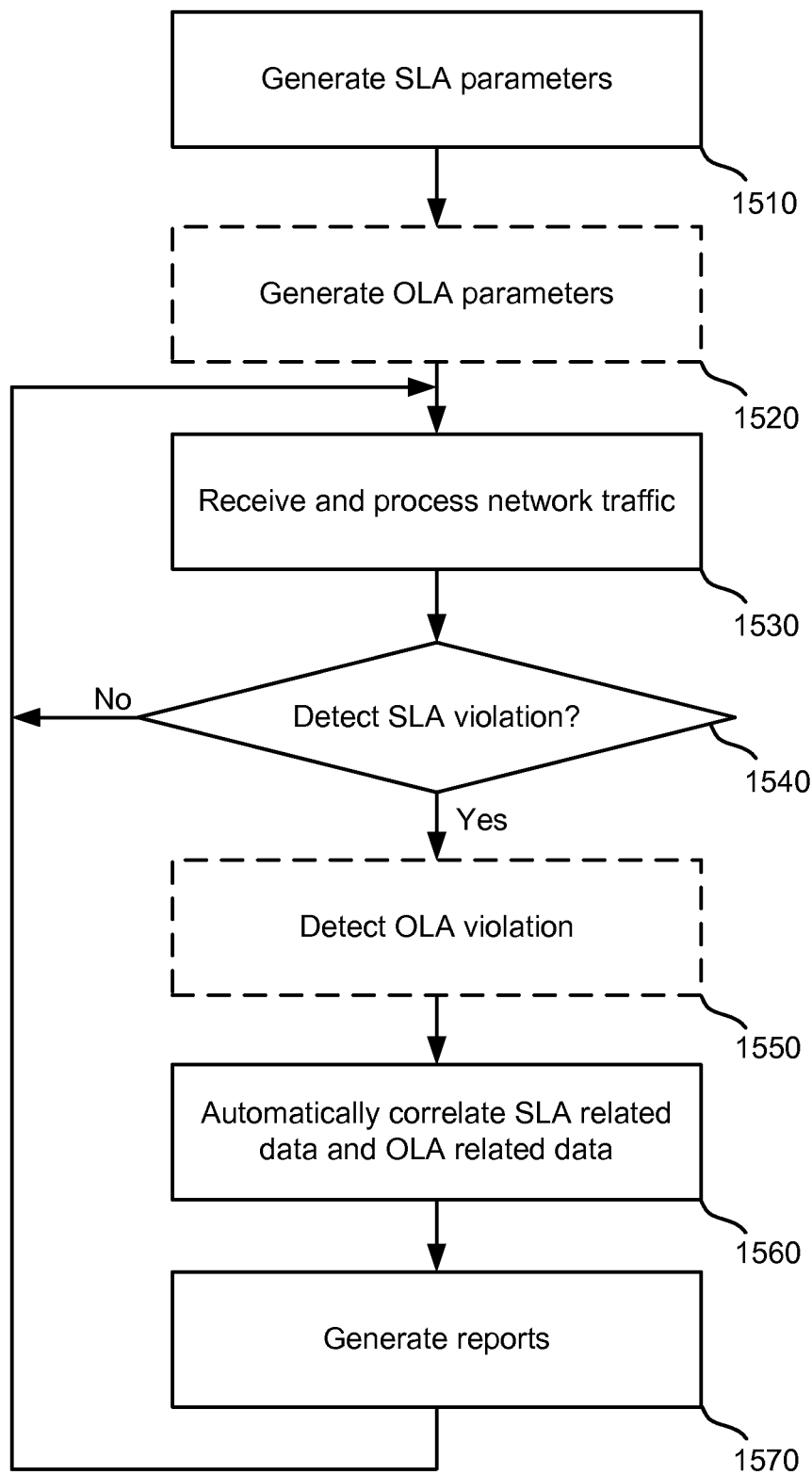
FIG. 15 is a flowchart of an embodiment of a process for correlating SLA related traffic monitoring data and OLA related application runtime data.

FIG. 15 is a flowchart of an embodiment of a process for automatically correlating SLA related traffic monitoring data and OLA related application runtime data. First, SLA parameters are generated at step 1510. The parameters may be used to determine whether an SLA is satisfied after a period of time. An administrator may generate the parameters using a command line, graphical user interface (GUI), or in some other manner. In some embodiments, the parameters may be automatically generated. The SLA parameters may include one or more thresholds to compare against traffic monitoring data for a network service, a time period over which the traffic monitoring data and thresholds are compared, an identification of transactions, transaction components or other transaction data subject to the SLA, and other data. The thresholds may relate to network service transaction metrics such as response time, success rate, six-Sigma, and other measurable elements of a network service. The time period over which the thresholds are monitored may be in terms of seconds, minutes, hours, days, weeks, months, or any other length of time. The SLA parameters can identify a transaction, business transaction, a business process, a domain of other set of data associated with the particular SLA. The business transaction may be identified using a rules engine to identify the transaction components or some other data from which a transaction can be identified. Generating SLA parameters is discussed in more detail below with respect to the process of FIG. 16.

OLA parameters are generated at step 1520. OLA parameters may be generated in a similar manner as SLA parameters as discussed above at step 1510. In particular, OLA parameters may be generated to include one or more thresholds associated with one or more transactions between application 1450 and one or more of backends 1420-1424, a time period over which to determine if the thresholds are satisfied, and a description of the transactions subject to the OLA. The thresholds may relate to a response time, success rate, six-Sigma, or some other metric or measurable quantity associated with an application backend transaction. For example, an OLA may exist between application server 152 and one backend, an application server and several backends, a backend and all application servers accessing that backend, or some other combination of components internal to a network service monitoring system. Generating OLA parameters is discussed in more detail below with the process of FIG. 17.

In some embodiments, step 1520 is optional, as indicated by the dashed lines comprising step 1520 in the flowchart of FIG. 15. Step 1520 may be optional because, in some embodiments, OLA parameters may be generated based on relationships observed during runtime between application 1450 and backends 1420-1424. In this case, OLA parameters would not be generated until after network traffic is received and processed at step 1530. In some embodiments, OLA parameters may be generated on relationships between application 1450 and backends 1420-1424 which are known before application 1450 processes network service traffic. In this embodiment, OLA parameters could be generated before traffic is processed by application 1450.

After generating parameters, network traffic is received and processed at step 1530. Processing network traffic includes receiving requests by network server 140 from client device 110 and processing the requests. In processing the requests, a response may be generated and sent to client device 110 by network server 140. Network server 140 may generate the response itself or based on additional processing by application server 150 and/or backend servers 1420-1424.

In some embodiments, as network traffic is processed by application server 150 on behalf of the network server 140, relationships between application server 150 and backends 1420-1424 are observed and recorded. These relationships can be used to configure OLA parameters, such as identification of the transaction that is subject to the SLA. The relationships between application server 150 and backends 1420-1424 may be observed and recorded by an application monitor that monitors the communication between server 150 and one or more backends or some other system. Configuring OLA parameters based on observed relationships is discussed in more detail below with respect to the process of FIG. 17.

A determination is made as to whether an SLA violation is detected at step 1540. In one embodiment, an SLA violation is detected if traffic monitoring data does not satisfy one or more service level thresholds for an identified transaction, business transaction, business process, or other identified communication over a certain period of time. Determining whether an SLA violation has occurred may be performed by an SLA manager, traffic monitoring system 180, application monitoring system 190 or some other entity. In some embodiments, an SLA violation may be tested for once every time period (e.g., for a time period of one hour, the determination can be made once an hour, such as once from 1:00 p.m.-2:00 p.m., once from 2:00 p.m.-3:00 p.m., and so on.). In some embodiments, the SLA violation determination is made according to a moving time window. Thus, for a time period of one hour, the SLA violation may be tested at five minute intervals for traffic monitoring data accumulated in the last hour (such as once from each of 1:00 p.m.-2:00 p.m., 1:05 p.m.-2:05 p.m., 1:10 p.m.-2:10 p.m., and so on). Determining if an SLA violation has been detected is discussed in more detail below with respect to the process of FIG. 18. If an SLA violation is not detected, the process of FIG. 15 returns to step 1530. If an SLA violation is detected, the process of FIG. 15 continues to step 1550.

An OLA violation may be detected at step 1550. In one embodiment, step 1550 is optional. Thus, an OLA violation may or may not be detected before correlating SLA related traffic monitoring data and OLA related application runtime data at step 1560. In some embodiments, an OLA violation may be detected before, after or about the same time that an SLA violation is detected, or not at all. Detecting an OLA violation involves determining that operating level thresholds associated with the OLA are not met by application runtime data for the period of time specified by the OLA parameters. Detecting an OLA violation is discussed in more detail below with respect to the process of FIG. 20. After detecting an OLA violation at step 1550, the process of FIG. 15 continues to step 1560.

SLA related traffic monitoring data and OLA related application runtime data are automatically correlated together at step 1560. In one embodiment, the correlation is done automatically by SLA manager 195, 1415 or 1410. The correlation involves determining what OLAs are related to an SLA which was not satisfied and correlate the appropriate portions of traffic monitoring data and application runtime data. As discussed above, an OLA is related to an SLA if the OLA related transaction between an application and a backend processes network service traffic subject to the SLA. In other words, the OLA related application runtime data is for the same transaction component as the SLA related traffic monitoring data. For example, for an SLA associated with a login transaction between client device 110 and network server 140, a related OLA may apply to the level of service provided by database 142 when application server 150 requests login credentials from database 142, application server 150 retrieving an image file for database 142 to be used in a login page, or some other related transaction of transaction component. Correlating SLA related traffic monitoring data and OLA related application runtime data is discussed in more detail below with respect to the process of FIG. 21.

After correlating SLA related traffic monitoring data and OLA related application runtime data, reports are generated at step 1570. The reports may indicate what SLA violation has occurred, the time of the violation, and details of the violation. The report may also indicate corresponding OLA related application runtime data associated with the SLA violation, time and details of the related OLA violations, and details of those violations. The reports may be provided to an administrator of the system or some other entity. After generating reports at step 1570, the process of FIG. 15 returns to step 1530.

An OLA and SLA may be correlated in different ways in different embodiments of the present technology. In some embodiments, it may not be known if an OLA or SLA is violated in a compliance period until the period has ended. In this case, the OLA and SLA information may be stored, accessed, and correlated at some time after the compliance period is over. Thus, the SLA and OLA information may be stored and processed at some later point in time, without respect to a corresponding SLA or OLA, which could be before or after a violation is detected for an SLA and/or an OLA.

Figure 16:
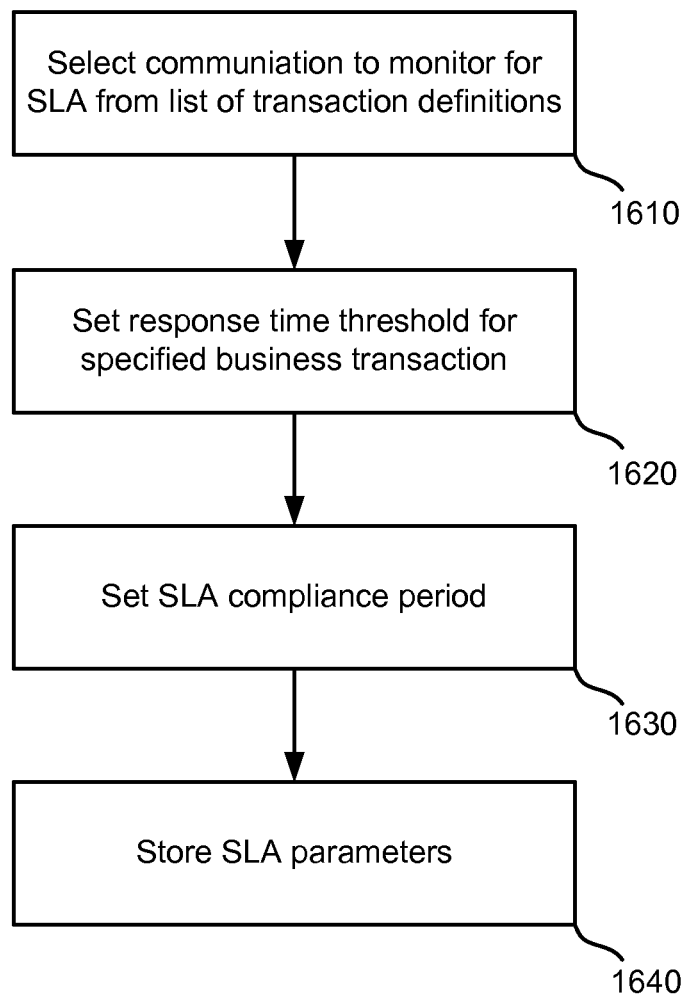
FIG. 16 is a flowchart of an embodiment of a process for generating SLA parameters.

FIG. 16 is a flowchart of an embodiment of a process for generating SLA parameters. In one embodiment, the process of FIG. 16 provides more detail of step 1510 of FIG. 15. First, an administrator selects a communication to monitor for the SLA from a list of transaction definitions at step 1610. In one embodiment, the list of transactions is a list of transaction definitions. The Transaction definitions are ultimately generated from observed traffic as discussed above at step 1060 in the process of FIG. 10. In some embodiments, an administrator may select a transaction component, transaction, business transaction, business process, domain or some other transaction communication. In some embodiments, a single business transaction can be associated with two or more different SLAs and several business transactions can be associated with one SLA.

For purposes of discussion, it is assumed that a business transaction was selected at step 1610. After selecting a business transaction to monitor, a response time threshold may be set for the selected business transaction at step 1620. A response time is the time between receiving a request from a user by a network service and sending a corresponding response to the user. Response time thresholds can be any number of milliseconds, seconds, or some other unit of time.

Setting a response time threshold at step 1620 is discussed for exemplary purposes. Other thresholds, such as a success rate, six-Sigma and other metrics and measurable elements of a network service, may also be specified for the business transaction subject to an SLA. In one embodiment, success rate is the percentage of transactions which are successfully completed; the ratio of successful responses sent (without regard to time) for the requests received. A six-Sigma value is a measure of quality which indicates a number of defects per million opportunities. Thus, the six-Sigma threshold would indicate all the defects for the SLA transaction per the number opportunities to make those defects. Six sigma metrics are generally known in the art.

A compliance period is set for the SLA at step 1630. The compliance period is a period over which thresholds are measured. The compliance period (or period) associated with an SLA may be set to any number of seconds, minutes, hours, days, or other unit of time. For example, compliance of a response time threshold may be measured for all business transactions within a compliance period of one week. After setting the compliance period, the SLA parameters are stored at step 1640. The SLA parameters may be stored locally to traffic monitoring system 180, with an SLA manager, on a remote database, or some other storage location.

Figure 17:
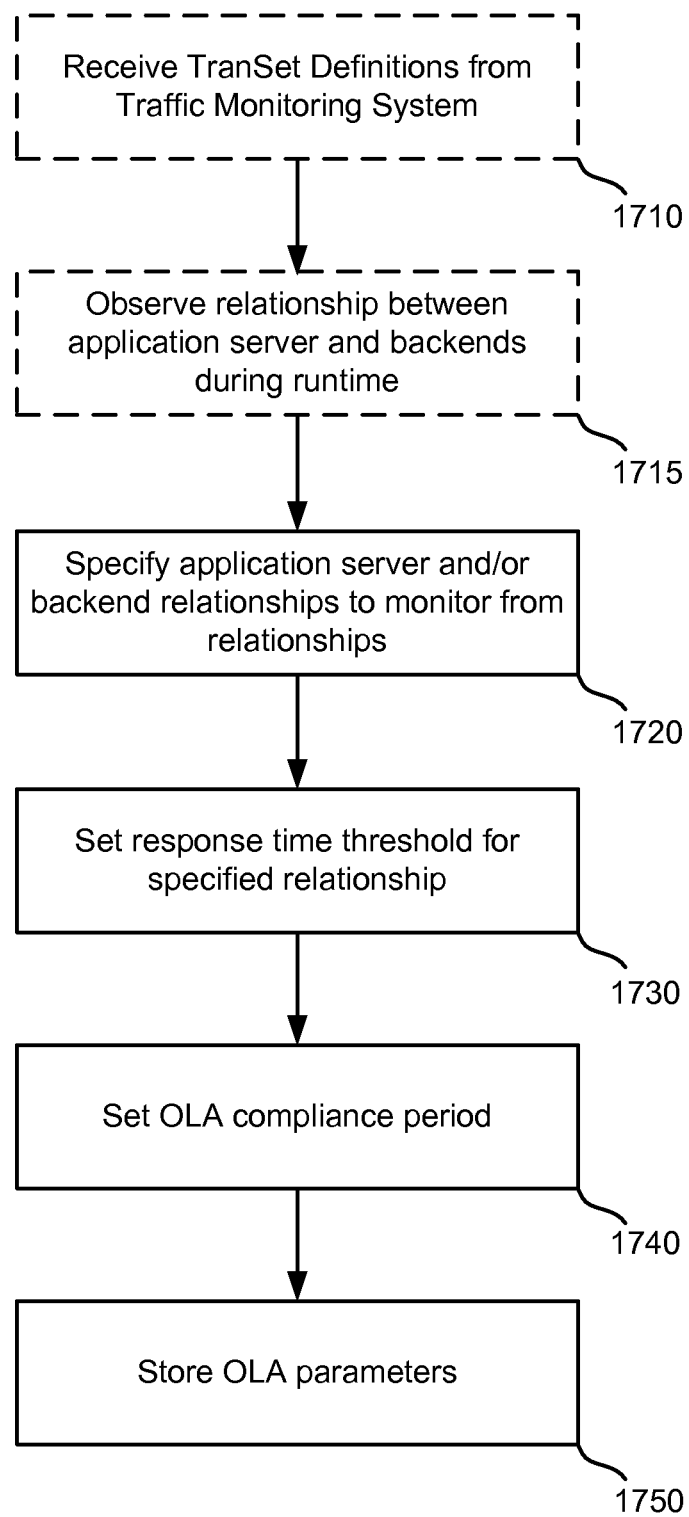
FIG. 17 is a flowchart of an embodiment of a process for generating OLA parameters.

FIG. 17 is a flowchart of an embodiment of a process for generating OLA parameters. In one embodiment, the process of FIG. 17 provides more detail for step 1520 of FIG. 15. Transaction definitions are received from traffic monitoring system 180 at step 1710. In one embodiment, the Transaction definitions are received by application monitoring system 190 from traffic monitoring system 180. The transaction definitions may be received as part of a rule engine received from traffic monitoring system 180 as discussed above with respect to step 1320 of FIG. 13. In one, application monitoring system 190 monitors an application, generates application runtime data based on the Transaction definitions, and then manages detection of OLA violations.

Relationships between application 1450 and backends 1420-1424 are observed during runtime at step 1715. The relationships are observed as application 1450 sends requests or other communication to any of backends 1420-1424. Observed relationships can be recorded as a list or table in a database, at an SLA manager, or at some other location and may be accessed later at step 1720. The list of relationships can be used to identify transactions between an application server and a backend to monitor for an OLA. In some embodiments, rather than observing relationships at runtime, relationships between application 1450 and backends 1420-1424 may be entered by a user or created in some other manner.

A relationship between an application 1450 and backends 1420-1424 may be specified for an OLA at step 1720. The relationship may be between application server 150 and one or more backends, a backend and one or more application servers, or some other entity combination. The relationship may be selected from relationships observed at step 1715 or from some other source of relationships between internal network service components.

A response time threshold is specified for the relationship specified for an OLA at step 1730. Specifying a response time threshold at step 1730 is similar to specifying a response time threshold for an SLA at step 1620 of the process of FIG. 16. In one embodiment, other thresholds may be set for an OLA, such as a success rate, six-Sigma, and other thresholds associated with a measurable aspect of the selected relationship.

A compliance period is set for evaluation the OLA thresholds at step 1740. OLA thresholds specified at step 1730 are compared against application runtime data over the compliance period. Similar to an SLA compliance period, an OLA compliance period may any number of seconds, hours, days, weeks, months or any other time unit. After setting parameters of one or more thresholds and a compliance period for an OLA, the OLA parameters are stored at step 1750. The OLA parameters may be stored at application monitoring system 190, within an SLA manager, or at some other storage location.

Figure 18:
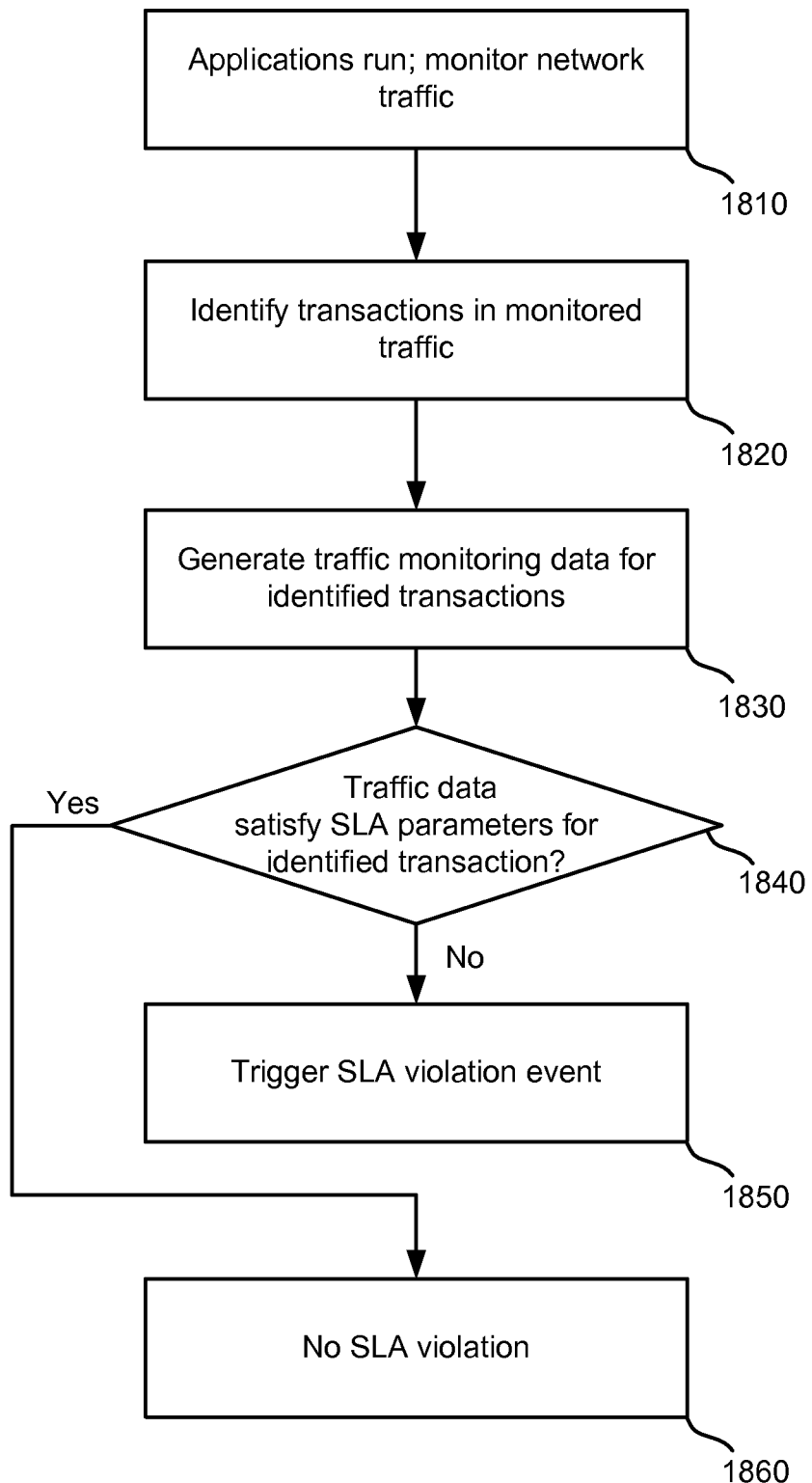
FIG. 18 is a flowchart of an embodiment of a process for detecting an SLA violation.

FIG. 18 is a flowchart of an embodiment of a process for detecting an SLA violation. In one embodiment, FIG. 18 provides more detail for step 1540 of the process of FIG. 15. Applications run and network traffic is monitored at step 1810. Network server 140 receives requests, generates a response to a request, and sends a response to the requesting entity. In some instances, a request may cause network server 140 to invoke application server 150, which may then process the network server request or send additional requests to any of backends 1420-1424. Requests are processed and corresponding responses are sent. Ultimately, network server 140 provides a response to a request received from client device 110. Requests received and responses sent by network server 140 are observed by traffic monitoring system 180.

Transactions in the monitored traffic are identified at step 1820. In one embodiment, the transactions are identified using the Transaction definitions. The Transaction definitions may be used to identify transaction components from request URL data and other data. Transactions are then identified from the transaction components using http request characteristics, such as URL host name, URL parameters, HTTP post parameters, cookie parameters and session manager parameters for each transaction. Identifying transactions in monitored traffic is discussed above with respect to component processing module 270 of FIG. 2 and step 930 of the process of FIG. 9.

After identifying transactions, traffic monitoring data for an identified transaction is generated at step 1830. Traffic monitoring data may include calculations of response time, success rate, six-sigma, a recorded transaction identifier, a session identifier, a user identifier, transaction parameters and other data. Generating the traffic monitoring data may include generating a transaction identifier with sets of traffic monitoring data. The transaction identifier may indicate the transaction associated with the set of transaction monitoring data. The traffic monitoring data may be stored at database server 360 or some other location.

A determination is made as to whether traffic monitoring data observed for the identified transaction satisfies the corresponding SLA parameters at step 1840. At this step, traffic monitoring data associated with the SLA transaction is compared with the thresholds of the SLA parameters. Comparing the traffic monitoring data to the generated thresholds is discussed in more detail below with respect to the process of FIG. 19. If the traffic monitoring data is not within the corresponding SLA parameters, an SLA violation event is triggered at step 1850. If traffic monitoring data is within the SLA parameters, the process of FIG. 18 ends at 1860 where it is determined no SLA violation has occurred during the compliance period.

In some embodiments, events may be triggered by the system of the present technology although traffic monitoring data may currently satisfy a particular SLA (and thus not currently result in a violation of an SLA). For example, an event such as an alert, message or other event may be generated to provide information about the traffic monitoring data. The event may be generated if a set of past traffic monitoring data suggests a pattern of degrading performance that may result in a violation in the future (even though the corresponding SLA violation has not been violated when the event is generated). For example, an event may be generated if traffic monitoring data exhibits a pattern of degrading health (e.g., response times or availability that gets worse over time) over the past hour that, if continued, would result in an SLA violation in the next fifteen minutes.

Additionally, an event may be generated for an SLA may be set up to monitor the performance of two (or more) transactions A and B even though an SLA is satisfied. The traffic monitoring data for both transactions may meet the threshold for an SLA that requires ninety-five percent compliance of a response time threshold. Individually, transaction A may be producing ninety-five percent of the traffic monitoring data of which ninety-nine percent satisfies the SLA and transaction B may produce five percent of the traffic monitoring data and completely fail the SLA. In this scenario, an event may be generated regarding the failure of transaction B. This may be especially practical if the transactions were related to different systems or accessed different backends.

Figure 19:
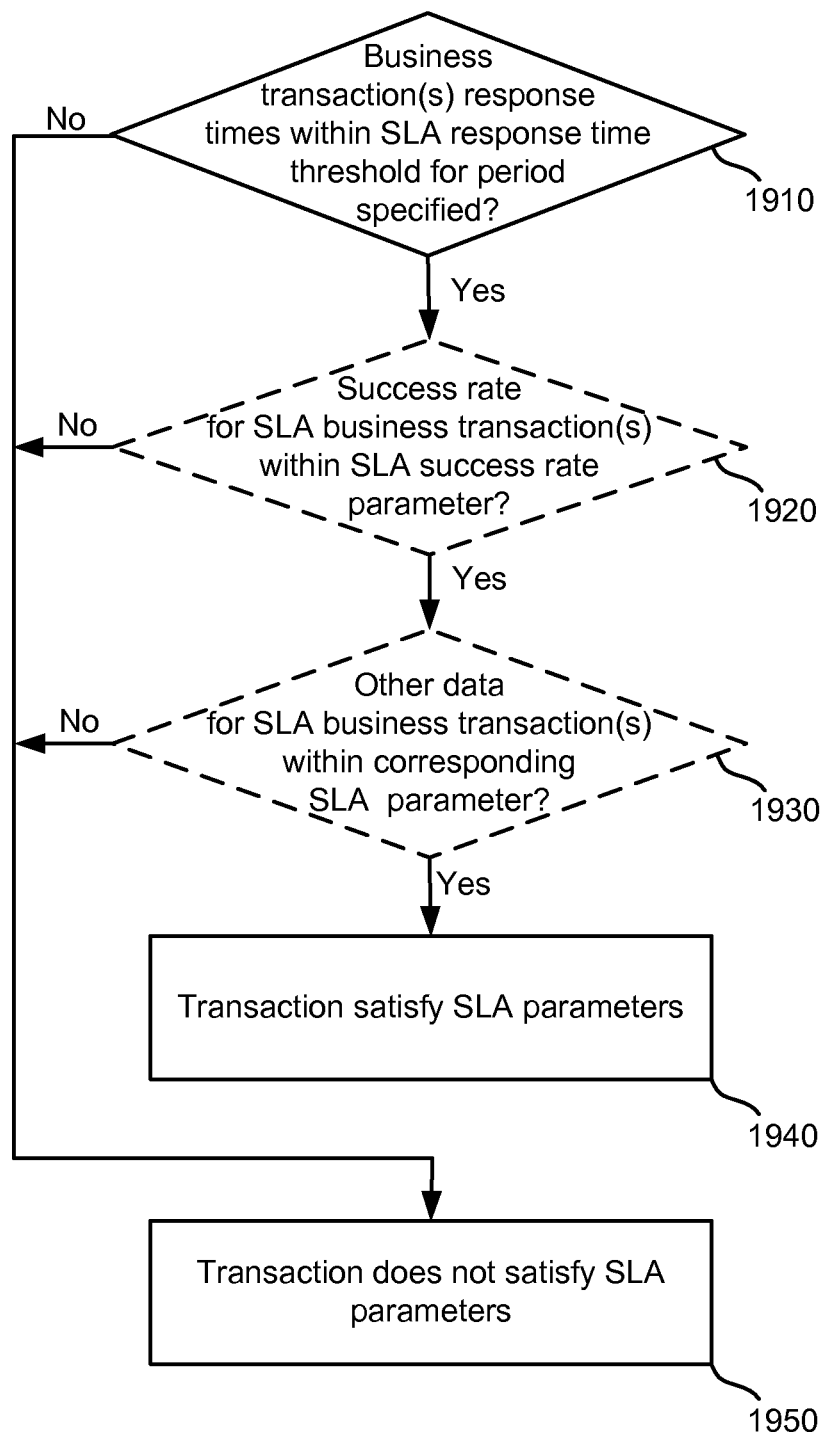
FIG. 19 is a flowchart of an embodiment of a process for comparing SLA parameters to traffic monitoring data.

FIG. 19 is a flowchart of an embodiment of a process for comparing SLA parameters to traffic monitoring data. In one embodiment, the process of FIG. 19 provides more detail for step 1840 of the process of FIG. 18. Any number of SLA parameters and parameter types may be used in comparison against traffic monitoring data. For purposes of discussion, SLA parameters of response time and success rate are discussed with respect to the process of FIG. 19, though fewer or additional parameters may be used as well.

A determination is made as to whether response times for SLA transactions are within a response time threshold for the period specified for the SLA at step 1910. The determination may include accessing the response time threshold, accessing traffic monitoring data for the transaction specified in the SLA, and comparing the response time threshold to the actual response times in the traffic monitoring data for the transaction over the SLA time period. The threshold may indicate that all instances of a transaction meet the threshold, that a percentage of the transactions meet a threshold, or some other expression for satisfying a threshold for occurrences of the transaction. For example, a response time threshold for a business transaction covered by an SLA may require that ninety-five percent of the covered business transactions have a response time of less than one second. The actual response times as retrieved from the traffic monitoring data may indicate that the transaction was performed ten times, with 1 response time of 1.5 seconds and 9 response times of 0.8 seconds. In this example, only ninety percent of the response times would meet the threshold requirement, so the threshold would not be satisfied. If the response time threshold is not satisfied by the actual response times for the transaction, the process of FIG. 19 continues to step 1950 where the transaction is determined to not satisfy SLA parameters. If the response times are within the threshold, a number of additional determinations may be made depending on any remaining SLA parameters.

Next, for SLAs that specify a success rate, a determination is made as to whether a success rate for the SLA transaction is within the SLA success rate threshold for the period specified at step 1920. Step 1920 is optional, depending on if the SLA parameters include a threshold for success rate. If the success rate for the transaction over the period covered by the SLA is within the SLA success rate threshold, additional data parameters may be tested for the transaction at step 1930. If the success rate for the SLA transaction is not within the success rate threshold, the transaction is determined to not satisfy the SLA parameters at step 1950. Other data for an SLA transaction may be compared to any remaining corresponding SLA parameter at step 1930. If all parameters for an SLA parameter set have been satisfied by a transaction for a specified period of time, the transaction is determined to be within SLA parameters at step 1940. If any SLA parameters are not met over the period of time by the transaction, the transaction is determined to not satisfy the SLA parameters at step 1950.

Figure 20:
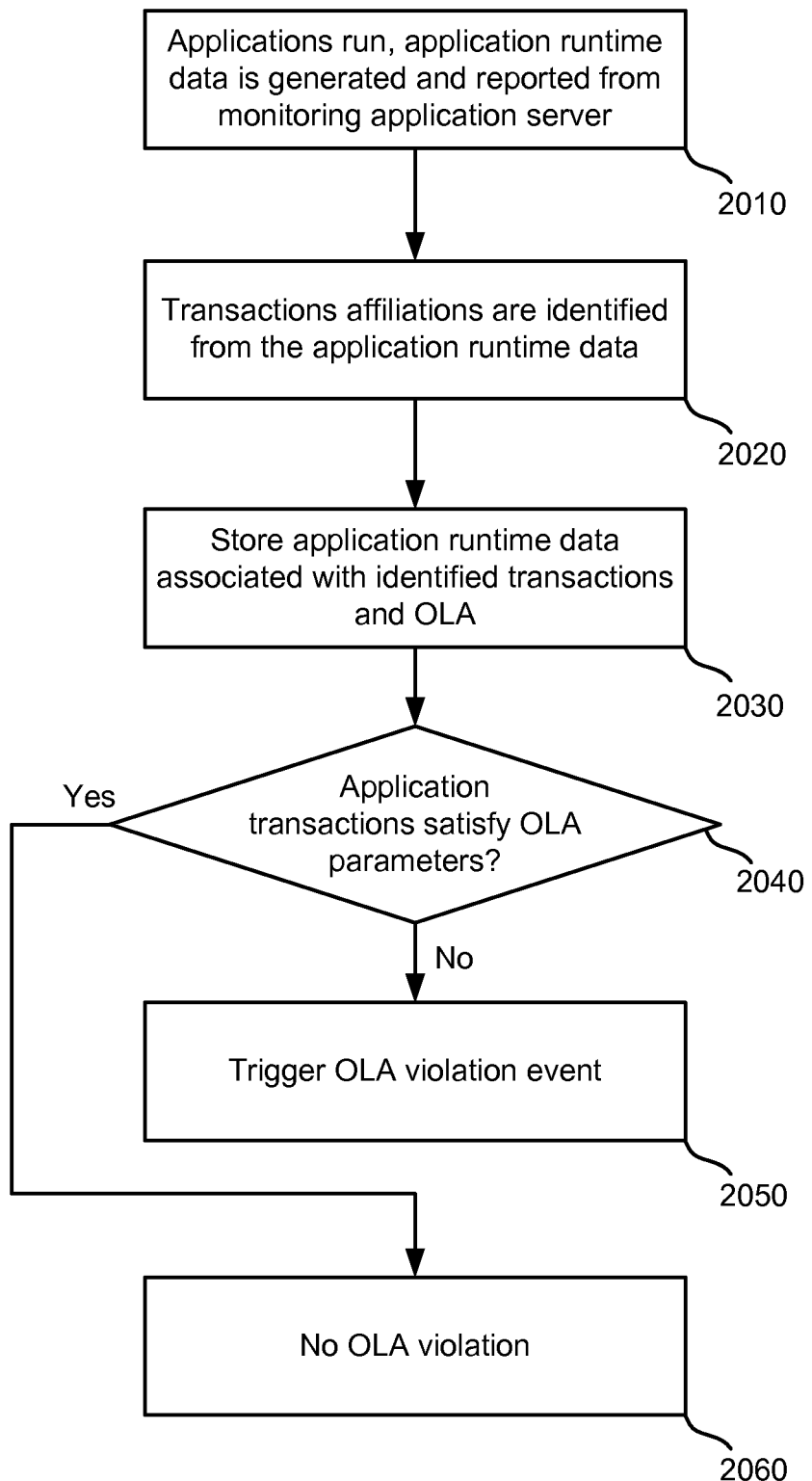
FIG. 20 is a flowchart of an embodiment of a process for detecting an OLA violation.

FIG. 20 is a flowchart of an embodiment of a process for detecting an OLA violation. In one embodiment, the process of FIG. 20 provides more detail for step 1550 of the process of FIG. 15. First, an application runs on application server 150, application runtime data is generated, and the data is reported at step 2010. In one embodiment, the application runtime data is reported by agent 152 or other software on application server 150 to application monitoring system 190. This is similar to step 1810 of FIG. 18, except that the application runtime data is generated from requests received and processed by application server 150. Generating and reporting application runtime data is discussed in more detail above with respect to the process of FIG. 12A.

Transaction affiliations are identified from the application runtime data at step 2020. In one embodiment, transaction components can be associated with reported application runtime data using rules generated from Transaction definitions. Transactions are then determined from the application components. This is performed in a similar to determining transaction affiliations for SLAs in step 1820 of the process of FIG. 8. Each application transaction can then be affiliated or associated with the corresponding business transaction.

In some embodiments, transactions may be identified from application runtime data as discussed above with respect to the process of FIG. 13. An application monitoring system may utilize a rules engine that is generated from an XML file (a configuration file that includes TranSetDefs) to identify transactions. The rules engine may apply rules and definitions stated in the file to provide information for associating transactions with one or more levels of a hierarchy. For instance, the rules engine may provide classification rules and/or descriptions for identifying a domain, business processes within the domain, business transactions within the business processes, transactions within the business transactions and transaction components within the transactions. Thus, the rules engine may associate application runtime data generated for each request received and processed by an application with a transaction component within the hierarchy. For example, the rules engine may describe HTTP request characteristics associated with a particular transaction or transaction component, such as a URL host name, URL parameters, HTTP post parameters, cookie parameters and session manager parameters for each transaction.

Each request received by the application includes parameter data associated with a transaction component. The parameter data may include, e.g., URL host name, URL parameters, HTTP post parameters, cookie and/or session manager parameters for each transaction. Agent 152, Enterprise Manager 155 or some other entity can compare the parameter data in the request against the set of classification rules identifying a transaction component. If the parameter data in the request matches a transaction component rule, the request is associated with the particular transaction component. Once a request that is received and processed by an application is associated with a transaction component, the corresponding business transaction can be identified using the hierarchy described by the classification rules.

The application runtime data associated with the identified business transactions is stored at step 2030. The stored data may also include an indication that the application runtime data is associated with an SLA. The indication can be implemented as an SLA bit stored with the application runtime data, storing the application runtime data in a separate SLA related table, or in some other manner. This stored data may be accessed later for further analysis, such as comparison against OLA parameters and for further analysis for an SLA violation. In some embodiments, step 2030 may be performed at step 2010 by agent 152.

A determination is made at step 2040 as to whether application transactions satisfy OLA parameters at step 2040. In this case, the application runtime data associated with an application transaction is compared to the OLA parameters associated with the transaction. Similar to step 1840 corresponding to an SLA, comparison of the application runtime data and the OLA parameter may include comparing a response time, a success rate, six-Sigma, or some other threshold for a particular period of time for the transaction. If the application runtime data for the application transaction is within the OLA parameter, then no OLA violation is detected at step 2060. If the application runtime data is not within the OLA parameter, an OLA violation event is triggered at step 2050.

Figure 21:
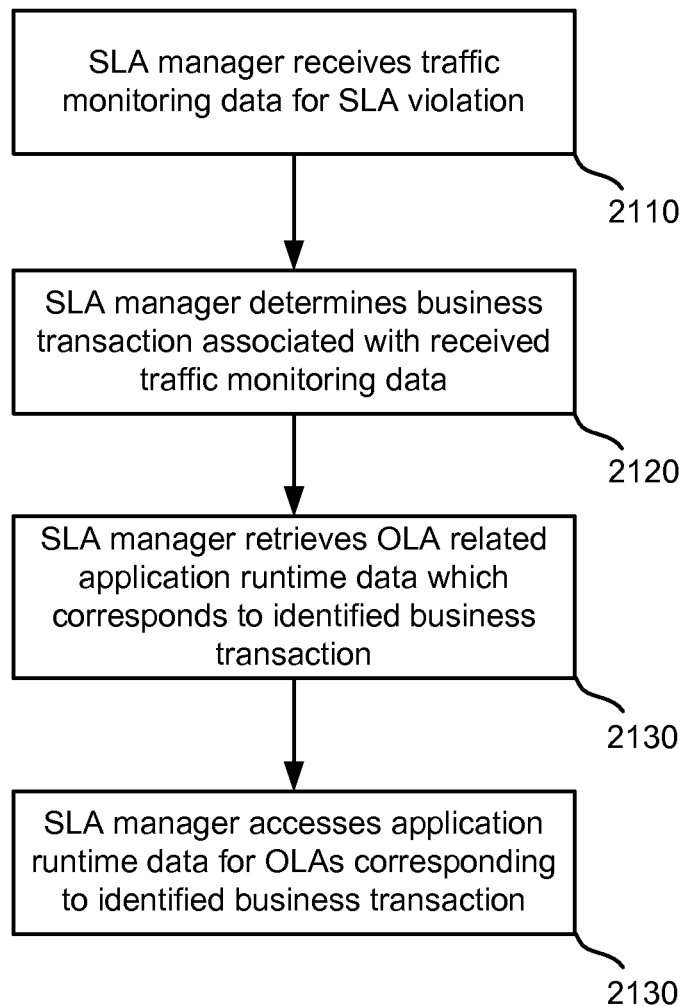
FIG. 21 is a flowchart of an embodiment of a process for correlating SLA related traffic monitoring data and OLA related application runtime data.

FIG. 21 is a flowchart of an embodiment of a process for automatically correlating SLA related traffic monitoring data and OLA related application runtime data. In one embodiment, the process of FIG. 21 provides more detail for step 1560 of the process of FIG. 15. First, an SLA manager receives traffic monitoring data for an SLA violation at step 2110. In one embodiment, the traffic monitoring data is provided automatically to an SLA manager by traffic monitoring system 180 upon detection of an SLA violation. The traffic monitoring data may include response time, success rate, sigma six, transaction component data transaction data, and other data derived from monitoring network server traffic and associated with the transaction subject to the violated SLA.

After receiving the traffic monitoring data, the SLA manager determines a business transaction associated with the received traffic monitoring data at step 2120. In one embodiment, a business transaction identifier is retrieved from the traffic monitoring data received at step 2110. The business transaction identifier may identify the particular business transaction using a numerical identifier, a unique string, the session identifier associated with the business transaction, a URL host, or identify the transaction in some other manner.

An SLA manager retrieves OLA related application runtime data that corresponds to the business transaction identified from the traffic monitoring data for the SLA violation at step 2130. In one embodiment, a request is sent to application monitoring system 190 for application monitoring data which corresponds with the particular business transaction and is subject to an OLA. For example, the request for application monitoring data may include a business transaction identifier (such as URL host name, business transaction name, or some other identifier) and a bit indicating that the data should be associated with an OLA. Application monitoring system may receive the request, access application monitoring data associated with the particular business transaction which is also associated with an OLA, and transmit the data to the requesting SLA manager. In some embodiments, application monitoring system may access a table that identifies blocks of application runtime data that are associated with a particular OLA, a particular business transaction, or both.

In some instances, both the SLA related traffic monitoring data and OLA application runtime data are automatically reported to an SLA manager (any of SLA managers 1410, 1415, and 195). An SLA violation message can be sent to the SLA manager from traffic monitoring system 180 when an SLA is determined to be violated. The SLA violation message may identify the business transaction subject to the SLA, the SLA, and optionally other data. Upon receiving the SLA violation message, the SLA manager may access the traffic monitoring data associated with the SLA and application runtime data associated with an OLA and the business transaction subject to the SLA. Once accessed, the SLA manager may report the correlated data to a user.

After retrieving the application runtime data, the SLA manager accesses the retrieved application runtime data for the OLAs corresponding to the identified business transaction at step 2130. The SLA manager now has traffic monitoring data associated with a business transaction that violated an SLA and application runtime data associated with one or more OLAs that correspond to the SLA. The process of FIG. 21 ends, and the SLA related traffic monitoring data and corresponding OLA application runtime data may be reported to an administrator, an alert may be generated indicating that a report is ready to view, or some other action may be taken as part of generating reports at step 1570 in the process of FIG. 5.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method, comprising:
   collecting traffic monitoring data over a period of time by monitoring traffic between a client device and an application which runs at an application server, wherein the traffic comprises a request from the client device to the application server, the application responds to the request by communicating a response to the client device, the response comprises a request-response pair identifier of the request and the response;
   comparing the traffic monitoring data to a set of service level thresholds;
   based on the comparing, identifying a portion of the traffic monitoring data which violates a service level threshold of the set of service level thresholds;
   determining a first transaction which is associated with the portion of the traffic monitoring data;

collecting application runtime data of the application over the period of time by monitoring execution of the application;
comparing the application runtime data to a set of operating level thresholds; and
automatically correlating the portion of the traffic monitoring data to a portion of the application runtime data, wherein the automatically correlating comprises using the request-response pair identifier to identify the portion of the application runtime data as being associated with the first transaction and classifying the traffic monitoring data and the application runtime data according to a set of transaction definitions.

2. The computer-implemented method of claim 1, wherein the first transaction is determined by comparing the traffic to a set of definitions to identify one of the definitions that correspond to the first transaction.

3. The computer-implemented method of claim 2, wherein the set of definitions identify transaction components of transactions comprising the first transaction.

4. The computer-implemented method of claim 1, further comprising:
generating traffic monitoring data by monitoring traffic between the classifying the traffic into transactions comprising the first transaction.

5. The computer-implemented method of claim 4, wherein the comparing traffic monitoring data to the set of service level thresholds comprises:
identifying traffic monitoring data to compare with the set of service level thresholds; and
classifying the identified traffic monitoring data as a transaction which matches a service level threshold transaction.

6. The computer-implemented method of claim 1, wherein:
the portion of the application runtime data is generated by the application when the application executes in response to the portion of the traffic monitoring data.

7. The computer-implemented method of claim 1, wherein the set of operating level thresholds corresponds to a transaction initiated by the application in response to a network server.

8. The computer-implemented method of claim 1, wherein:
the portion of the application runtime data is identified as being associated with the first transaction when the portion of the application runtime data matches a same transaction definition of the set of transaction definitions as the portion of the traffic monitoring data.

9. The computer-implemented method of claim 1, wherein:
said the automatically correlating comprises retrieving the request-response pair identifier from the response, and the using the request-response pair identifier is responsive to the retrieving.

10. The computer-implemented method of claim 1, wherein the automatically correlating comprises:
organizing the traffic monitoring data and the application runtime data using a common hierarchy.

11. The computer-implemented method of claim 1, wherein:
the application communicates with a back end device when the application executes, and the set of operating level thresholds is applied to communications between the application and the back end device.

12. The computer-implemented method of claim 1, wherein:
the application is a particular application among multiple applications which communicate with a back end device when the multiple applications execute; and the portion of the traffic monitoring data is automatically correlated with the particular application.

13. The computer-implemented method of claim 1, wherein:
the first transaction is determined to be associated with the portion of the traffic monitoring data by determining that the first transaction is associated with the service level threshold which is violated.

14. The computer-implemented method of claim 1, wherein:
the portion of the application runtime data is identified as being associated with the first transaction by determining that one of the operating level thresholds is associated with the first transaction, and determining that the portion of the application runtime data is associated with the one of the operating level thresholds.

15. The computer-implemented method of claim 1, further comprising:
indexing the application runtime data to the request-response pair identifier to provide indexed application runtime data, the using the request-response pair identifier comprises accessing the indexed application runtime data.

16. The computer-implemented method of claim 1, wherein:
the response comprises an IP address of the application server; and
the automatically correlating the portion of the traffic monitoring data to the portion of the application runtime data uses the IP address to identify the portion of the application runtime data as being associated with the first transaction.

17. The computer-implemented method of claim 1, wherein:
the response comprises a name of an agent associated with the application; and
the automatically correlating the portion of the traffic monitoring data to the portion of the application runtime data uses the name of the agent to identify the portion of the application runtime data as being associated with the first transaction.

18. A processor readable storage device comprising processor readable code embodied on the processor readable storage devices, the processor readable code for programming a processor to perform a method comprising:
determining whether a portion of traffic monitoring data collected over a period of time satisfies a set of service level thresholds associated with a network transaction, the traffic monitoring data is collected by monitoring traffic between a client device and an application which runs at an application server, the traffic comprises a request sent from the client device to the application server and a corresponding response sent from the application server to the client device, the response comprises identifying data of the application server, and the monitoring comprises retrieving the identifying data of the application server;
accessing application runtime data associated with a set of operating level thresholds for a transaction initiated by the application, wherein the application runtime data is generated by monitoring execution of the application, the application runtime data is indexed to the identifying data, each application transaction is initiated by the network transaction and the accessing application runtime data comprises classifying the application runtime data according to a set of transaction definitions; and automatically correlating the portion of traffic monitoring data and the application runtime data that correspond to a same network transaction using the application runtime data.

19. The processor readable storage device of claim 18, wherein the determining comprises:
identifying network transactions by comparing the traffic to the set of transaction definitions.

20. The processor readable storage device of claim 18, wherein the determining comprises:
comparing the traffic to transaction definitions and
generating traffic monitoring data that identifies a definition that matches the traffic.

21. The processor readable storage device of claim 18, wherein the identifying data of the application server comprises an identifier of an agent of the application server, the agent generates the application runtime data.

22. The processor readable storage device of claim 18, wherein the method performed further comprises:
reporting traffic monitoring data that did not satisfy the set of service level thresholds and reporting the application runtime data associated with the same network transaction as the reported traffic monitoring data.

23. The processor readable storage device of claim 18, wherein:
said the identifying data of the application server comprises a name of an agent associated with the application.

24. The processor readable storage device of claim 18, wherein:
said the identifying data of the application server comprises a class name of a servlet which is involved in generating the response.

25. The processor readable storage device of claim 18, wherein:
said the identifying data of the application server comprises an IP address of the application server.

26. The processor readable storage device of claim 18, wherein:
said the identifying data of the application server comprises an identifier of a request handler which is an entry point to the application.

27. A computer-implemented method, comprising:
configuring service level thresholds to be satisfied by traffic between a client and a network server, and a period of time over which to measure compliance to the service level thresholds, the service level thresholds are configured from a set of transaction definitions;
monitoring the traffic to provide traffic monitoring data;
configuring operating level thresholds to be satisfied by an application which responds to a request in the traffic from the client;
monitoring execution of the application to provide application runtime data;
classifying the traffic monitoring data and the application runtime data according to the set of transaction definitions;
triggering a violation event when one of the service level thresholds has not been satisfied by the network server over the period of time; and
in response to the violation event, automatically providing a portion of the traffic monitoring data which is associated with the violation event to a service level agreement manager, the service level agreement manager responding to the violation event by determining a business transaction associated with the portion of the traffic monitoring data, and automatically determining one of the operating level thresholds that corresponds to the business transaction.

28. The computer-implemented method of claim 27, wherein:
the operating level thresholds are configured from observed communications involving the application.

29. The computer-implemented method of claim 27, wherein:
the one of the service level thresholds that has not been satisfied is identified by comparing the service level thresholds to the traffic monitoring data.

30. A computer-implemented method, comprising:
accessing traffic monitoring data derived from monitoring network server traffic and associated with a set of service level thresholds, the network server traffic comprises requests sent from client devices to an application running at an application server, and corresponding responses sent from the application server to the client devices, the responses comprise identifying data of the application server, and the monitoring network server traffic comprises retrieving the identifying data from the responses;
identifying transaction information, comprising the identifying data from the responses, from the traffic monitoring data; and
using the identifying data to automatically access application runtime data generated from monitoring the application when the application processes the network server traffic, wherein the application runtime data is associated with the transaction information, the traffic monitoring data is classified by a transaction hierarchy and the application runtime data is organized into a hierarchy associated with business transactions.

31. The computer-implemented method of claim 30, wherein the identifying transaction information comprises:
comparing the traffic monitoring data to the set of service level thresholds to determine whether the service level thresholds are satisfied.

32. The computer-implemented method of claim 31, wherein the identifying transaction information comprises:
identifying transaction information from traffic monitoring data associated with one of the service level thresholds that is not satisfied.

33. The computer-implemented method of claim 30, wherein the identifying data comprises an IP address of the application server.

34. A computer-implemented method, comprising:
receiving requests at an application which executes on a network server, the requests are from clients over a period of time, the application processing the requests by sending corresponding requests from the application to a remote system, the remote system returning information to the application for responding to the requests, an agent associated with the application correlating the requests from the clients with the requests to the remote system, and the agent providing application runtime data relating to communications between the application and the network server for the period of time;
comparing the application runtime data to a set of operating level thresholds; and
responsive to the agent, classifying the application runtime data with the requests from the clients, the requests to the remote system, an identifier of the application and an identifier of the remote system.

35. The computer-implemented method of claim 34, further comprising:

tracing execution of the application which occurs in response to the requests from the clients, wherein the correlating and the classifying are responsive to the tracing.

* * * * *

UNITED STATES PATENT AND TRADEMARK OFFICE
CERTIFICATE OF CORRECTION

PATENT NO. : 8,578,017 B2
APPLICATION NO. : 11/610409
DATED : November 5, 2013
INVENTOR(S) : Cobb et al.

It is certified that error appears in the above-identified patent and that said Letters Patent is hereby corrected as shown below:

In the Claims

Col. 43, line 23 (claim 4, line 4): After "comprising:" and before "classifying" delete "generating traffic monitoring data by monitoring traffic between the"

Signed and Sealed this
Third Day of June, 2014

Michelle K. Lee
*Deputy Director of the United States Patent and Trademark Office*